United States Patent
Takii

(10) Patent No.: US 11,159,107 B2
(45) Date of Patent: Oct. 26, 2021

(54) MOTOR DRIVING APPARATUS

(71) Applicant: U-MHI PLATECH CO., LTD., Aichi (JP)

(72) Inventor: Takashi Takii, Aichi (JP)

(73) Assignee: U-MHI PLATECH CO., LTD., Aichi (JP)

( * ) Notice: Subject to any disclaimer, the term of this patent is extended or adjusted under 35 U.S.C. 154(b) by 169 days.

(21) Appl. No.: 16/623,913

(22) PCT Filed: Sep. 7, 2018

(86) PCT No.: PCT/JP2018/033223
§ 371 (c)(1),
(2) Date: Dec. 18, 2019

(87) PCT Pub. No.: WO2020/049719
PCT Pub. Date: Mar. 12, 2020

(65) Prior Publication Data
US 2021/0297016 A1    Sep. 23, 2021

(51) Int. Cl.
| | |
|---|---|
| *H02M 7/493* | (2007.01) |
| *H02P 5/74* | (2006.01) |
| *B29C 45/76* | (2006.01) |
| *H02P 29/50* | (2016.01) |
| *H02P 27/06* | (2006.01) |

(Continued)

(52) U.S. Cl.
CPC ............ *H02P 5/74* (2013.01); *B29C 45/7666* (2013.01); *H02P 25/22* (2013.01); *H02P 27/06* (2013.01); *H02P 29/50* (2016.02); *B29C 2045/1792* (2013.01); *B29C 2945/76521* (2013.01); *B29C 2945/76525* (2013.01)

(58) Field of Classification Search
CPC .. H02P 5/74; H02P 25/22; H02P 29/50; H02P 27/06; B29C 45/7666;

(Continued)

(56) References Cited

U.S. PATENT DOCUMENTS

2010/0071970 A1   3/2010   Welchko et al.
2017/0302217 A1  10/2017   Shinomoto et al.
(Continued)

FOREIGN PATENT DOCUMENTS

EP    3098963 A2   11/2016
EP    3136582 A     3/2017
(Continued)

OTHER PUBLICATIONS

International Search Report for PCT/JP2018/033223 dated Nov. 20, 2018.
(Continued)

*Primary Examiner* — Muhammad S Islam
(74) *Attorney, Agent, or Firm* — Pearne & Gordon LLP

(57) ABSTRACT

A motor driving apparatus includes a first motor group including a number N of individual servo motors, a second motor group including a number N of individual second servo motors driven synchronously with the servo motors, and an inverter control unit. The inverter control unit controls a first switching total value and a second switching total value to be reversed in positive/negative sign. The first switching total value is obtained by subtracting the number of semiconductor switching devices opened in circuit on low potential side from the number of semiconductor switching devices opened in circuit on first high potential side, corresponding to the first motor group. The second switching total value is obtained by subtracting the number of semiconductor switching devices opened in circuit on high potential side from the number of second switching elements opened in circuit on low potential side, corresponding to the second motor group.

18 Claims, 15 Drawing Sheets

(51) Int. Cl.
 *H02P 25/22* (2006.01)
 *B29C 45/17* (2006.01)
(58) Field of Classification Search
 CPC ........... B29C 2945/76525; B29C 2945/76521; B29C 2045/1792
 See application file for complete search history.

(56) References Cited

U.S. PATENT DOCUMENTS

2019/0123675 A1\* 4/2019 Nawa .................... H02M 7/537
2019/0326904 A1\* 10/2019 Takakura ............. H03K 17/687

FOREIGN PATENT DOCUMENTS

| JP | 2001-119975 A | 4/2001 |
| JP | 2001-341176 A | 12/2001 |
| JP | 2004-314491 A | 11/2004 |
| JP | 2009-38847 A | 2/2009 |
| JP | 2014-23168 A | 2/2014 |
| JP | 6195676 B2 | 8/2017 |

OTHER PUBLICATIONS

Written Opinion of the International Search Authority for PCT/JP2018/033223 dated Nov. 20, 2018.
Supplementary European Search Report for EP 18 92 8988 dated Aug. 24, 2020.

\* cited by examiner

FIG. 14

MOTOR DRIVING APPARATUS

This is the National Stage of PCT international application PCT/JP2018/033223 filed on Sep. 7, 2018, the content of which is incorporated herein by reference in its entirety.

TECHNICAL FIELD

The present invention relates to a motor driving apparatus that can reduce a leakage current to the ground.

BACKGROUND ART

An electrically-driven injection molding machine includes a plurality of screw forward/backward movement servo motors of an injection apparatus (for example, servo motors (10) disclosed in Patent Literature 1), and a plurality of mold opening/closing servo motors of a mold clamping apparatus (for example, servo motors (27) disclosed in Patent Literature 2), which are synchronously controlled.

In each of these servo motors, a voltage of an AC power supply is rectified into a DC voltage by a rectification circuit, and the DC voltage is further adjusted in ON/OFF timing by a semiconductor switching device. As a result, the servo motors are supplied as driving power with an inverter circuit output that is subjected to increased/decreased DC voltage and frequency conversion.

In each of the servo motors, for example, a conductor in electrical continuity with its own stator is connected to the ground earth through an independent ground end of each other. In the following, the ground earth is simply referred to as the ground. At this time, a stray capacitance component is generated between the stator and each of phase windings in each of the servo motors. Power-supply noise that is caused by ON/OFF switching of the semiconductor switching device of the inverter circuit, is supplied together with the power supply current to the phase windings of each of the servo motors. The power-supply noise as a leakage current flows out to and flows from the ground through the stray capacitance component and the ground terminal.

Some frequency components of the leakage current flowing out to and flowing from the ground is superimposed as line noise on a control current of the other servo motor. This may cause noise problem and malfunction of the servo motor, in addition to impairment in reliability of motor control.

As a method to reduce the line noise caused by the leakage current, for example, Patent Literature 3 has been proposed.

Patent Literature 3 proposes a power conversion apparatus that includes a leakage current detection unit and a leakage current control unit. The leakage current detection unit detects a zero-phase current that flows to the ground from one of a motor driving apparatus driving a motor with power from an AC power supply and the motor. The leakage current control unit receives the zero-phase current detected by the leakage current detection unit to generate a periodic control signal synchronized with the AC power supply. The power conversion apparatus receives the control signal to generate a reverse-phase current reversed in phase from the zero-phase current, and outputs the reverse-phase current. Further, the power conversion apparatus causes the zero-phase current to flow into the ground to cancel the zero-phase current and the leakage current.

According to the proposition by Patent Literature 3, the line noise caused by the leakage current can be reduced but the leakage current detection unit is necessary as an additional device. This leads to complication of an attachment structure for attaching the detection unit to the injection molding machine, and to increase in cost. Further, it is extremely difficult to prevent delay of a response time of the reverse-phase current that cancels the leakage current detected by the leakage current detection unit, with high accuracy and high precision. Accordingly, the phase of the reverse-phase current is practically shifted by the response time, which may cause the leakage current corresponding to the shift amount.

CITATION LIST

Patent Literature

Patent Literature 1: JP 2001-341176 A
Patent Literature 2: JP 2004-314491 A
Patent Literature 3: JP 6195676 B2

SUMMARY OF INVENTION

Technical Problem

Accordingly, an object of the present invention is to provide a motor driving apparatus that makes it possible to effectively reduce the leakage current without addition of a device exemplified by the leakage current detection unit disclosed in Patent Literature 3.

Solution to Problem

A motor driving apparatus according to the present invention includes: a first motor group including a number N of individual first three-phase AC motors; a second motor group including a number N of individual second three-phase AC motors; an electrical conductor that connects first stators of the first three-phase AC motors and second stators of the second three-phase AC motors and is grounded; and a control unit configured to control driving of the first three-phase AC motors and the second three-phase AC motors.

The control unit according to the present invention includes a first switching element group including switching element to independently control AC currents of respective phases of the first three-phase AC motors, and a second switching element group including switching elements to independently control AC currents of respective phases of the second three-phase AC motors.

The control unit according to the present invention controls a first switching total value M1 and a second switching total value M2 to be reversed in positive (+)/negative (−) sign. The first switching total value M1 is obtained by subtracting a number of first switching elements opened in circuit on low potential side from a number of first switching elements opened in circuit on high potential side in the first switching element group. The second switching total value M2 is obtained by subtracting a number of second switching elements opened in circuit on low potential side from a number of second switching elements opened in circuit on high potential side in the second switching element group.

Note that, in the present invention, "opened in circuit" indicates that the switching device is turned on and the circuit is energized.

In the motor driving apparatus according to the present invention, the first three-phase AC motors and the second three-phase AC motors are preferably synchronously controlled, and the first switching elements in the first switching element group and the second switching elements in the second switching element group are preferably controlled to supply AC currents of reversed phases.

The motor driving apparatus according to the present invention preferably includes a control unit configured to control driving of the first three-phase AC motors and the second three-phase AC motors.

The control unit includes the first switching elements to control the AC currents to be supplied to the first three-phase AC motors, and the second switching elements to control the AC currents to be supplied to the second three-phase AC motors. Further, the control unit provides phase difference corresponding to a half period of switching operation, between first switching operation by the first switching elements for the first three-phase AC motors and second switching operation by the second switching elements for the second three-phase AC motors.

According to the present invention, positive or negative first noise generated by operation of the first switching elements in the first switching element group and negative or positive second noise generated by operation of the second switching elements in the second switching element group are synchronously generated.

In the motor driving apparatus according to the present invention, first winding coils wound around each of the first stators and second winding coils wound around each of the second stators are preferably wound in opposite directions. In this case, the control unit can perform control to supply currents to the first three-phase AC motors and the second three-phase AC motors in opposite directions.

The control unit can perform control to supply the currents to the first three-phase AC motors and the second three-phase AC motors in the opposite directions in a state where the first three-phase AC motors and the second three-phase AC motors are stopped while voltages are applied to the first winding coils and the second winding coils.

In the motor driving apparatus according to the present invention, in a case where the number N of individual motors in each of the first motor group and the second motor group is one, the control unit can perform control to supply the currents to the first three-phase AC motor and the second three-phase AC motor in the opposite directions.

Further, in the motor driving apparatus according to the present invention, in a case where the number N of individual motors in each of the first motor group and the second motor group is a same value of two or more, the control unit can perform control to supply the currents to all of the two or more first three-phase AC motors in a same direction, and perform control to supply the currents to all of the two or more second three-phase AC motors in a same direction that is opposite to the direction of the currents supplied to the first three-phase AC motors.

In the motor driving apparatus according to the present invention, in a case where first winding coils in each of the first three-phase AC motors and second winding coils in each of the second three-phase AC motors are wound in a same direction, the first stators and the second stators can be disposed at positions shifted by a half period in magnetic field angle.

In the motor driving apparatus according to the present invention, each of the first three-phase AC motors can include a plurality of sets of the first stators, and each of the second three-phase AC motors can include a plurality of sets of the second stators.

In a case where the first winding coils in each of the first three-phase AC motors and the second winding coils in each of the second three-phase AC motors are wound in a same direction, the first stators and the second stators can be disposed at positions shifted by a half period in magnetic field angle.

The motor driving apparatus according to the present invention includes a first power cable that electrically connects a plurality of first winding coils wound around each of the plurality of sets of the first stators with the first switching elements, and a second power cable that electrically connects a plurality of second winding coils wound around each of the plurality of sets of the second stators with the second switching elements in some cases. In this case, the first power cable and the second power cable of a same phase are preferably bundled.

In the power driving apparatus according to the present invention, one or both of the first winding coils and the second winding coils may be each configured by a pair of coils that are coaxially wound in opposite directions.

Advantageous Effects of Invention

According to the present invention, the first switching total value M1 that is obtained by subtracting the number of first switching elements opened in circuit on the low potential side from the number of first switching elements opened in circuit on the high potential side in the first switching element group, and the second switching total value M2 that is obtained by subtracting the number of second switching elements opened in circuit on the low potential side from the number of second switching elements opened in circuit on the high potential side in the second switching element group are reversed in positive (+)/negative (−) sign. Accordingly, in particular, the number of first switching elements opened in circuit on the high potential side in the first switching element group and the number of second switching elements opened in circuit on the low potential side in the second switching element group are made equal to each other, as well as the number of first switching elements opened in circuit on the low potential side in the first switching element group and the number of second switching elements opened in circuit on the high potential side in the second switching element group are made equal to each other. As a result, with respect to the leakage current (charges) generated by being induced by the ground-side stator through the stray capacitance component by the electrostatic induction caused by potential difference between the phase winding side and the ground side on each of the first three-phase AC motors and the second three-phase AC motors, the leakage current (charges) similarly generated on the stators of the second motor group is equivalent but is reversed in positive/negative sign.

According to the present invention, since the first stators and the second stators are in electrical continuity with each other, the first stator and the second stator mutually compensate by mutually exchanging the induced charges. Thus, the charges are maintained between the first stators and the second stators. Accordingly, when the first stators and the second stators are regarded to be integrated, there is no potential difference from the ground. Therefore, the charges between the first stators and the second stators do not flow out to the ground, which makes it possible to prevent the leakage current from flowing out to the ground.

BRIEF DESCRIPTION OF DRAWINGS

FIG. 13B illustrates a state of a current flowing into the capacitor when the switching devices on the one side of the inverter circuit are all OFF and the switching devices on the other side are all ON.

FIG. 14 is a table illustrating combinations in which a value obtained by, in an inverter main circuit 15A, subtracting the number of semiconductor switching devices opened in circuit on low potential side from the number of semiconductor switching devices opened in circuit on high potential side, and a value obtained by, in an inverter main circuit 15B, subtracting the number of semiconductor switching devices opened in circuit on low potential side from the number of semiconductor switching devices opened in circuit on high potential side have the same absolute value and reversed positive (+)/negative (−) signs.

DESCRIPTION OF EMBODIMENTS

Some embodiments illustrating the present invention are described below with reference to accompanying drawings.

Embodiment 1

Figure 1:
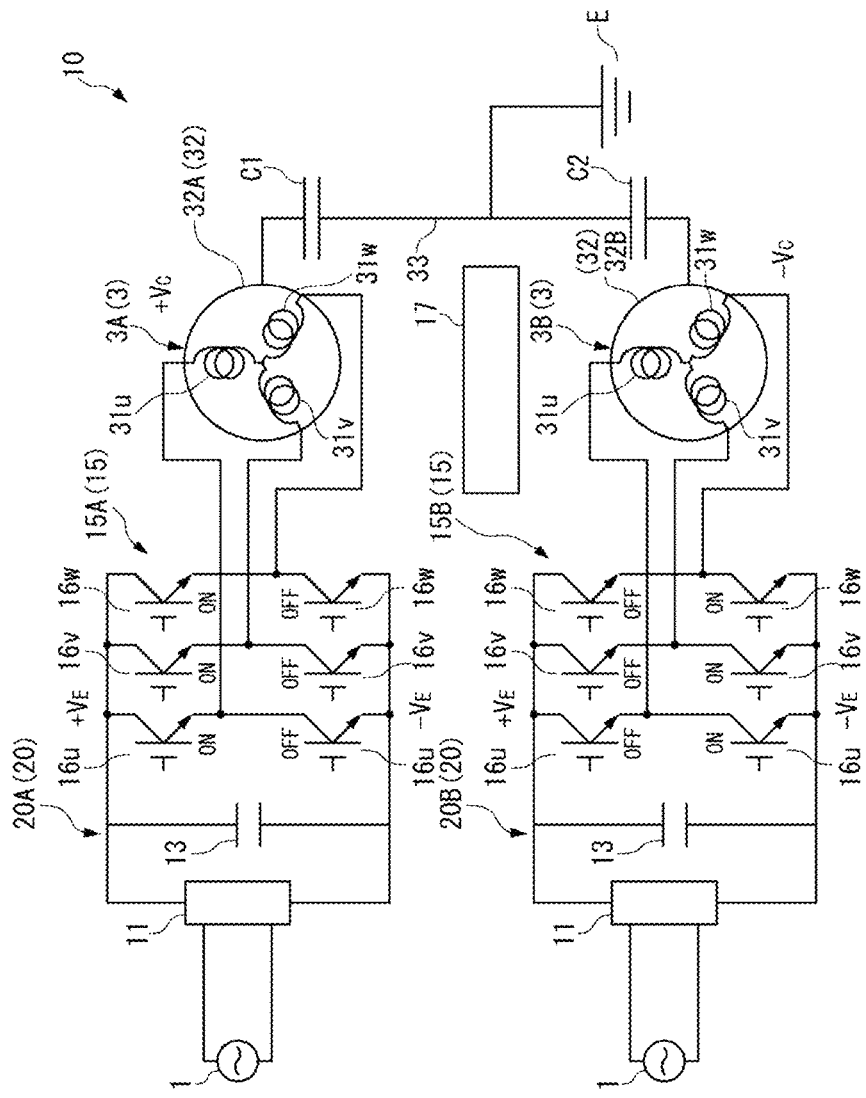
FIG. 1 is a block diagram illustrating a motor driving apparatus according to Embodiment 1 of the present invention.

As illustrated in FIG. 1, a motor driving apparatus 10 according to Embodiment 1 converts an AC current output from a three-phase AC power supply 1 into a DC current, further converts the converted DC current into the AC current and supplies the AC current to three-phase AC motor, thereby driving the three-phase AC motor. In the present embodiment, the three-phase AC motor is illustrated as a servo motor 3; however, the three-phase AC motor according to the present invention is not limited to the servo motor, and may be a three-phase AC electric motor (actuator) driven by an inverter circuit, such as an inductive electric motor, a synchronous electric motor, and a PM (Permanent Magnet) motor, or a generator. These motors and generator can achieve similar action and effects.

[Entire Configuration]

As illustrated in FIG. 1, in Embodiment 1, two servo motors 3A and 3B are provided, and inverter circuits 20 (20A and 20B) are provided corresponding to the two servo motors 3A and 3B. In the following, in a case where distinction of both of the servo motor 3A and the servo motor 3B is unnecessary, the motors are simply denoted by servo motors 3. In a case where distinction of both of the servo motor 3A and the servo motor 3B is necessary, the motors are denoted by the servo motor 3A and the servo motor 3B. The inverter circuits 20 and components thereof are similarly handled.

As illustrated in FIG. 1, each of the inverter circuits 20 includes, as main components, a rectifier 11 that converts the AC current output from the three-phase AC power supply 1 into the DC current, a smoothing capacitor 13 that is provided between the rectifier 11 and an inverter main circuit 15, and the inverter main circuit 15 that receives the DC current from the rectifier 11 to drive the corresponding servo motor 3.

Further, the inverter circuits 20 include an inverter control unit 17 that controls the inverter main circuits 15. The inverter control unit 17 controls ON/OFF of each of semiconductor switching devices 16u, 16v, and 16w configuring the inverter main circuits 15. In FIG. 1, the single inverter control unit 17 is illustrated so as to control both of inverter main circuits 15A and 15B; however, an inverter control unit corresponding to the inverter main circuit 15A and an inverter control unit corresponding to the inverter main circuit 15B may be separated from each other.

The inverter control unit 17 controls ON/OFF of each of the semiconductor switching devices 16u, 16v, and 16w configuring the inverter main circuit 15A and the inverter main circuit 15B so as to supply the AC currents of reversed phases to the servo motor 3A and the servo motor 3B.

The inverter control unit 17 detects the currents of the servo motors 3 and voltages of the smoothing capacitors 13 to control ON/OFF of the semiconductor switching devices 16u, 16v, and 16w.

Further, the inverter control unit 17 synchronously controls operation of the servo motor 3A and the servo motor 3B based on information from an encoder of each of the Servo Motors 3A and 3B.

[Servo Motor 3]

As illustrated in FIG. 1, each of the servo motors 3 is configured by a three-phase AC servo motor, and includes three coils 31u, 31v, and 31w each configured by winding, and a stator 32 (32A or 32B) configured by a conductive material around which the coils 31u, 31v, and 31w are wound. Each of the servo motors 3 includes a rotor rotatably provided inside the stator 32 in addition to the coils 31u, 31v, and 31w and the stator 32; however, illustration thereof is omitted in FIG. 1. This is true of Embodiment 2 and subsequent embodiments. The rotor may be configured by a permanent magnet, a coil, or a cage in some cases.

The servo motor 3A and the servo motor 3B have the same specification, and operation thereof are synchronously controlled. The servo motor 3A corresponds to one of a first motor group and a second motor group in the present invention, and the servo motor 3B corresponds to the other of the first motor group and the second motor group in the present invention. In Embodiment 1, the number N of individual servo motors 3 in each of the first motor group and the second motor group is the same value and is one.

The stator 32A of the servo motor 3A and the stator 32B of the servo motor 3B are in electrical continuity through an electrical conductor 33. The electrical conductor 33 is connected to ground E.

[Rectifier 11]

Each of the rectifiers 11 is configured by a device having rectification action that causes the current to flow only in one direction, and converts the AC current output from the three-phase AC power supply 1 into the DC current. Each of the rectifiers 11 includes, for example, a pair of rectifier diodes, and rectifies the AC current alternately flowing through the pair of rectifier diodes. To cause the AC current to alternately flow through the pair of rectifier diodes, for example, each of the rectifiers 11 includes semiconductor switching devices corresponding to the respective rectifier diodes. Note that each of the rectifiers 11 may be replaced with a converter that can supply the current from the motor side to the rectifier 11 side by regeneration or power generation.

[Smoothing Capacitor 13]

Each of the smoothing capacitors 13 smooths a signal in order to suppress ripple generated even after rectification by the rectifier 11 and to obtain a current closer to a direct current. In a case where the smoothing capacitor 13 is inserted after rectification, power is charged when a voltage is high, and the power is discharged when the voltage is low. This achieves effect to suppress variation of the voltage.

[Inverter Main Circuit 15 (15A and 15B)]

As illustrated in FIG. 1, each of the inverter main circuits 15 includes the semiconductor switching devices 16$u$, 16$v$, and 16$w$ that respectively correspond to the u-phase coil 31$u$, the v-phase coil 31$v$, and the w-phase coil 31$w$ provided in the corresponding servo motor 3. Each of the semiconductor switching devices 16$u$, 16$v$, and 16$w$ are provided in a pair. The semiconductor switching devices 16$u$, 16$v$, and 16$w$ are divided into the semiconductor switching devices 16$u$, 16$v$, and 16$w$ disposed on upper side in the figure, and the semiconductor switching devices 16$u$, 16$v$, and 16$w$ disposed on lower side in the figure.

Each of the inverter main circuits 15 supplies, as an inverter circuit output, driving currents generated by switching ON/OFF of the semiconductor switching devices 16$u$, 16$v$, and 16$w$, to the coils 31$u$, 31$v$, and 31$w$, respectively.

Each of the semiconductor switching devices 16$u$, 16$v$, and 16$w$ can be configured by an IGBT (Insulated Gate Bipolar Transistor), a MOSFET (Metal-Oxide-Semiconductor Field-Effect Transistor), or any of other semiconductor devices.

[Inverter Control Unit 17]

The inverter control unit 17 controls ON/OFF of each of the semiconductor switching devices 16$u$, 16$v$, and 16$w$ configuring the inverter main circuits 15A and 15B. The inverter main circuits 15A and 15B synchronously control the servo motors 3A and 3B through the control.

The inverter control unit 17 controls ON/OFF of each of the semiconductor switching devices 16$u$, 16$v$, and 16$w$ so as to supply the currents of reversed phases to the servo motor 3A and the servo motor 3B. This is achieved by delaying a switching period of one of the inverter main circuits 15A and 15B by the inverter control unit 17 from a switching period of the other of the inverter main circuits 15A and 15B by a phase of a half period.

[Noise Waveform]

Figure 11:
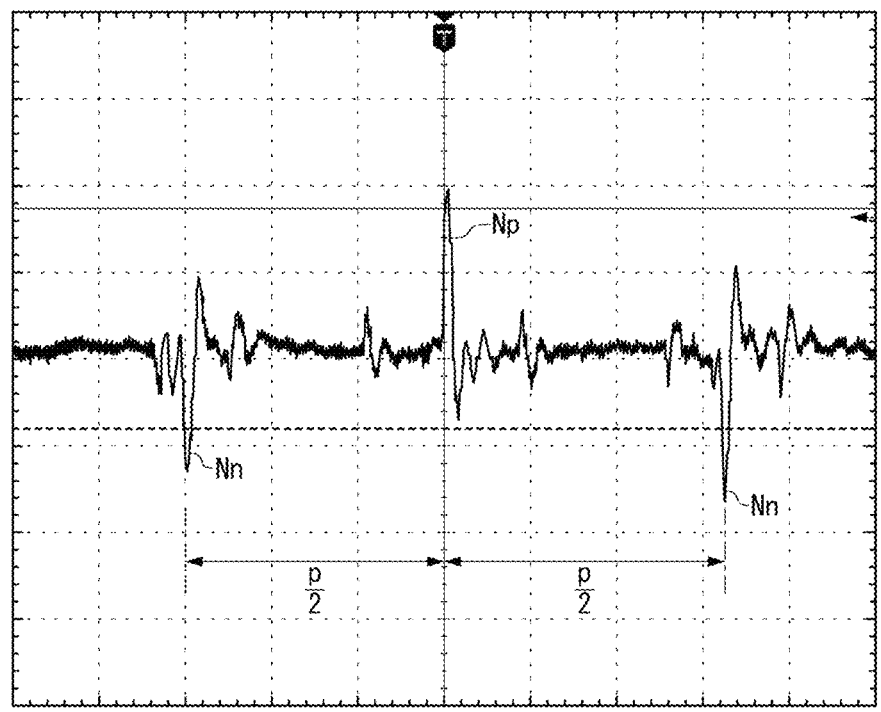
FIG. 11 is a diagram illustrating a noise waveform of a single three-phase AC motor.

FIG. 11 illustrates a noise waveform targeted by the present embodiment. The noise waveform is obtained from a single servo motor. As illustrated in FIG. 11, negative-side impulse noise Nn and positive-side impulse noise Np repeatedly appear in synchronization with switching of the corresponding inverter main circuit 15. An interval between the noise Nn and the noise Np corresponds to a half period P/2 of the switching operation, and an interval between the noise Nn and the noise Nn adjacent to each other corresponds to one period P of the switching operation.

[Stray Capacitance]

Figure 12A:
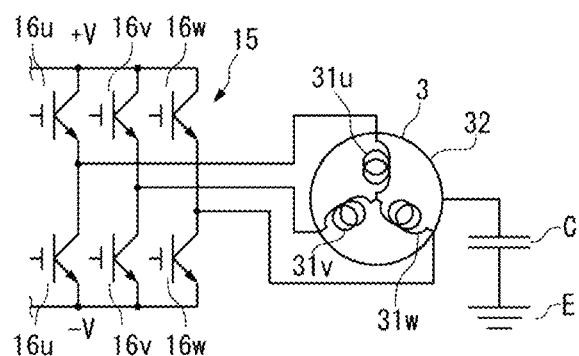
FIG. 12A is a block diagram illustrating a stray capacitance between coils and a stator of a three-phase AC motor, as a capacitor to the ground in a combination of an inverter main circuit and the three-phase AC motor.

DC power (for example, ±282 V) that is obtained by rectifying the power (for example, 400V) of the three-phase AC power supply 1 is assumed with respect to the single inverter main circuit 15 and the single servo motor 3. An attachment gap is inevitably generated between each of the coils 31 and the stator 32 of the servo motor 3, and the gap is regarded as the stray capacitance. In FIG. 12A, the stray capacitance is illustrated as a capacitor C with respect to the ground E (0 V).

Figure 12B:
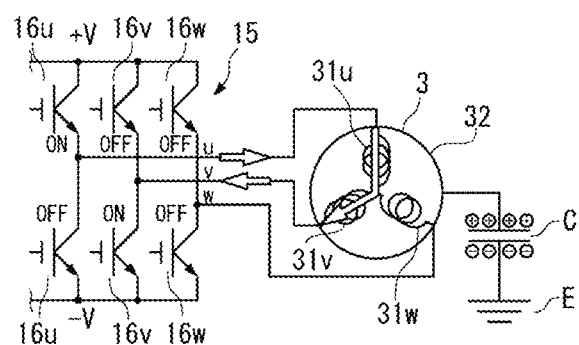
FIG. 12B is a block diagram illustrating an example of charges generated in the capacitor when the inverter main circuit is operated.

ON/OFF of the semiconductor switching devices 16$u$, 16$v$, and 16$w$ of the inverter main circuit 15 are performed, for example, in a manner illustrated in FIG. 12B. As a result, charges of opposite positive/negative polarities are generated in the coils 31$u$, 31$v$, and 31$w$ and the stator 32 due to voltage load to the coils 31$u$, 31$v$, and 31$w$, namely, potential rise. The charges of the stator 32, namely, on the ground E side are induced by electrostatic induction. Note that the positive/negative charges illustrated in the capacitor C of FIG. 12B are illustrative, and may be reversed in some cases.

[Positive Impulse Noise to Ground E]

Figure 13A:
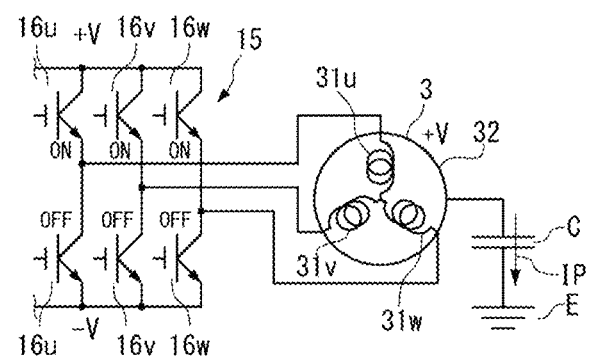
FIG. 13A illustrates a state of a current flowing into the capacitor when switching devices on one side of the inverter circuit are all ON and switching devices on the other side are all OFF.

In the configuration of FIG. 12A, the three semiconductor switching devices 16$u$, 16$v$, and 16$w$ on an upper stage of the inverter main circuit 15 are all turned on, whereas the three semiconductor switching devices 16$u$, 16$v$, and 16$w$ on a lower stage are all turned off. At this time, the potential of the servo motor 3 becomes a positive value (for example, +282 V). As a result, as illustrated in FIG. 13A, a differential waveform current Ip of the voltage waveform flows through the capacitor C.

When the servo motor 3A is, for example, a servo motor driving an injection apparatus of a large injection molding machine, a current I of about +20 A flows out to the ground E, which causes large positive impulse noise.

[Negative Impulse Noise to Ground E]

Figure 13B:
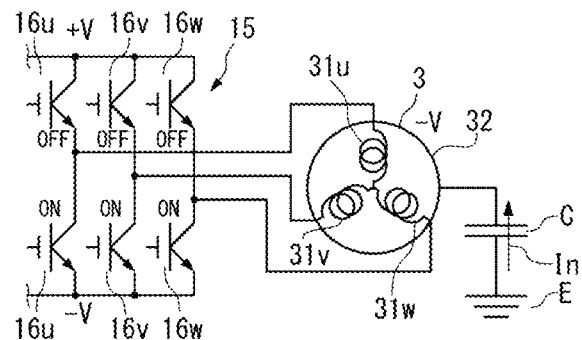

In the configuration of FIG. 12A, the three semiconductor switching devices 16$u$, 16$v$, and 16$w$ on the upper stage of the inverter main circuit 15 are all turned off, whereas the three semiconductor switching devices 16$u$, 16$v$, and 16$w$ on the lower stage are all turned on. At this time, the potential of the servo motor 3 becomes a negative value (for example, −282 V). As a result, as illustrated in FIG. 13B, a differential waveform current In of the voltage waveform flows through the capacitor C.

When the servo motor 3A is, for example, a servo motor driving an injection apparatus of a large injection molding machine, a current I of about −20 A flows out to the ground E, which causes large negative impulse noise.

[Switching Control (Motor Stop) of Inverter Main Circuit 15]

It is assumed that the servo motors 3A and 3B are stopped while the voltage is applied to all of the three-phase coils 31$u$, 31$v$, and 31$w$ as illustrated in FIG. 1. In FIG. 1, as an example, the three semiconductor switching devices 16$u$, 16$v$, and 16$w$ on an upper stage of the inverter main circuit 15A are all ON, and the three semiconductor switching devices 16u, 16v, and 16w on a lower stage of the inverter main circuit 15A are all OFF. Further, the three semiconductor switching devices 16u, 16v, and 16w on an upper stage of the inverter main circuit 15B are all OFF, and the three semiconductor switching devices 16u, 16v, and 16w on a lower stage of the inverter main circuit 15B are all ON.

At this time, the potential of the coils 31u, 31v, and 31w of the servo motor 3A is +Vc, and the differential waveform current Ip of the voltage waveform flows through a capacitor C1. Further, the potential of the coils 31u, 31v, and 31w of the servo motor 3B is −Vc, and the differential waveform current In of the voltage waveform flows through a capacitor C2. The currents Ip and In are leakage currents that are equal absolute values and are reversed in sign. Accordingly, the leakage currents are canceled between the servo motor 3A and the servo motor 3B, and no leakage current flows to the ground E. In contrast, even if the potential on the servo motor 3A side is −Vc and the potential on the servo motor 3B side is +Vc, the current just flows in the opposite direction. No leakage current still flow to the ground E.

[Switching Control (Motor Driving) of Inverter Main Circuit 15]

Next, control to synchronously drive the servo motor 3A and the servo motor 3B is described.

In the present embodiment, phase difference of a half period, namely, 180 degrees is provided between the switching operation in the inverter main circuit 15A and the switching operation in the inverter main circuit 15B. As a result, the AC currents of reversed phases are supplied to the first servo motor 3A and the second servo motor 3B, and the noise generated on the servo motor 3A side and the noise generated on the servo motor 3B side are canceled.

Figure 2:
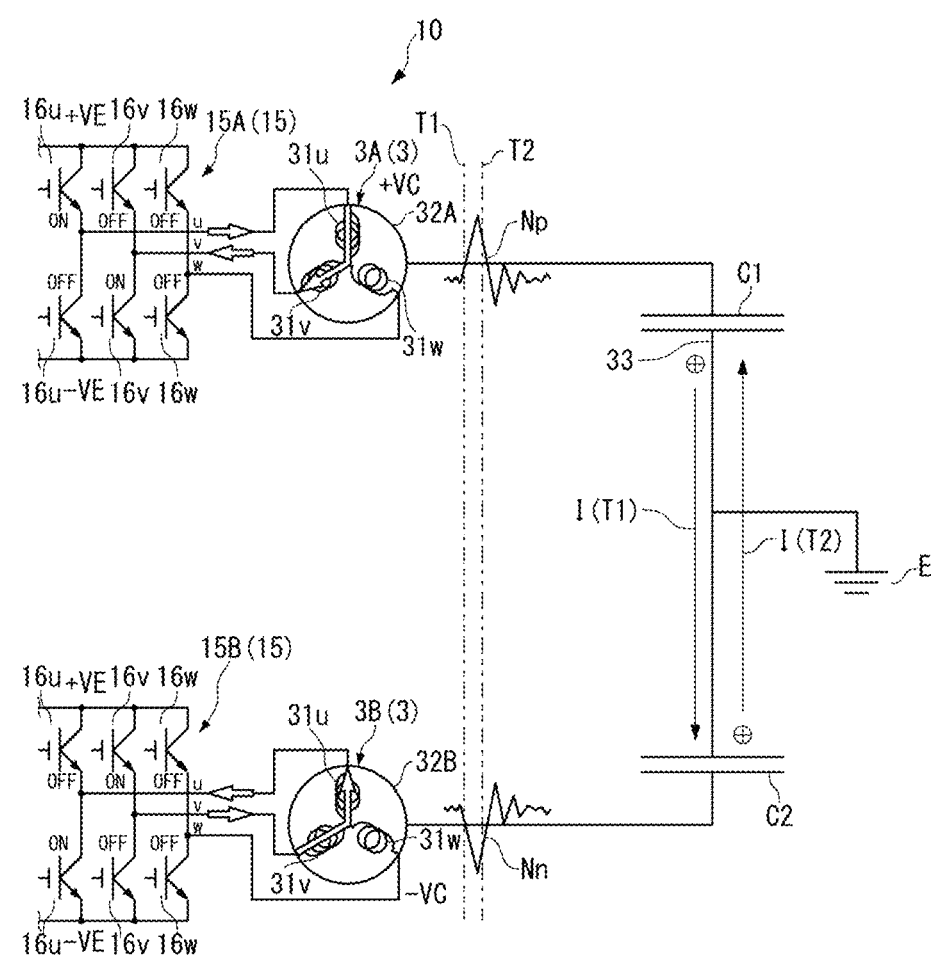
FIG. 2 is a diagram to explain action canceling noise by Embodiment 1.
Figure 14:
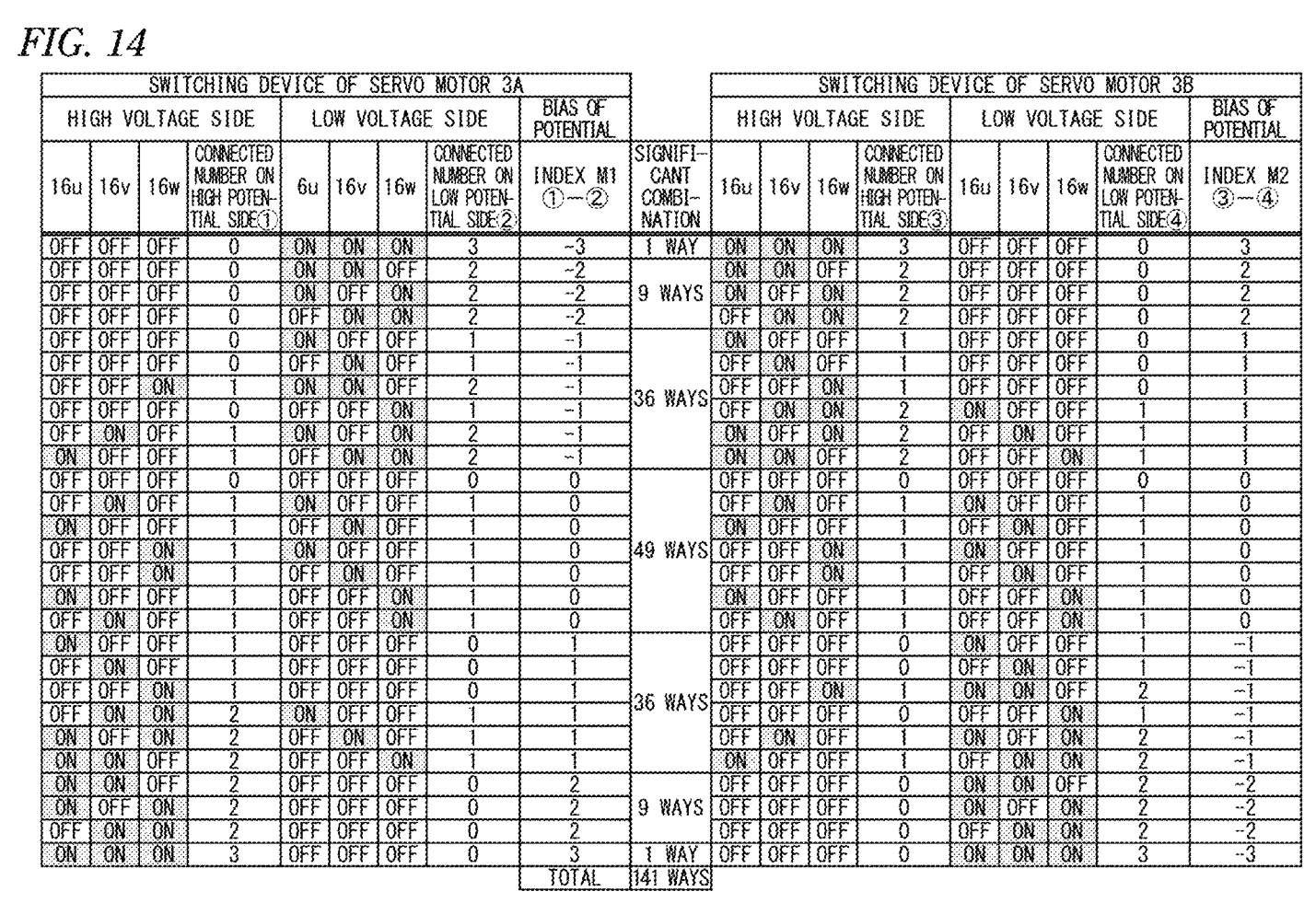

The action of noise cancellation is described based on FIG. 1, FIG. 2, and FIG. 14.

In FIG. 1, the voltage on the high potential side is denoted by $+V_E$, and the voltage on the low potential side is denoted by $-V_E$. Further, in the inverter main circuit 15A, the three semiconductor switching devices 16u, 16v, and 16w on the high potential side are opened in circuit. In the inverter main circuit 15B, the three semiconductor switching devices 16u, 16v, and 16w on the low potential side are opened in circuit. As a result, the potentials applied to the servo motor 3A and the servo motor 3B are equivalent but reversed in positive/ negative sign.

In the present invention, however, a preferable combination enabling noise cancellation, of the number of semiconductor switching devices opened in circuit on each of the high potential side and the low potential side in the inverter main circuit 15A and the number of semiconductor switching devices opened in circuit on each of the high voltage side and the low potential side in the inverter main circuit 15B, is not limited thereto, and there are combinations illustrated in FIG. 14.

In FIG. 14, in the inverter main circuit 15A corresponding to the servo motor 3A, a value obtained by subtracting the number (connected number) of semiconductor switching devices 16u, 16v, and 16w opened in circuit on the low potential side from the number (connected number) of semiconductor switching devices 16u, 16v, and 16w opened in circuit on the high potential side, is denoted by M1. Further, in the inverter main circuit 15B corresponding to the servo motor 3B, a value obtained by subtracting the number (connected number) of semiconductor switching devices 16u, 16v, and 16w opened in circuit on the low potential side from the number (connected number) of semiconductor switching devices 16u, 16v, and 16w opened in circuit on the high potential side, is denoted by M2.

For example, in particular, when the number of semiconductor switching devices opened in circuit on the high potential side in the inverter main circuit 15A and the number of semiconductor switching devices opened in circuit on the low potential side in the inverter main circuit 15B are equal to each other, further, and the number of semiconductor switching devices opened in circuit on the low potential side in the inverter main circuit 15A and the number of semiconductor switching devices opened in circuit on the high potential side in the inverter main circuit 15B are equal to each other, the values M1 and M2 have the same absolute value and reversed positive (+)/negative (−) signs. There are 141 ways for such a switching combination as illustrated in FIG. 14.

In FIG. 2, the semiconductor switching device 16u on the upper stage of the inverter main circuit 15A is turned on and the semiconductor switching devices 16v and 16w are turned off. Further, the semiconductor switching device 16v on the lower stage of the inverter main circuit 15A is turned on and the semiconductor switching devices 16u and 16w are turned off. As a result, a power supply current illustrated by a void arrow flows through the inverter main circuit 15A and the servo motor 3A.

On the other hand, the semiconductor switching device 16v on the upper stage of the inverter main circuit 15B is turned on and the semiconductor switching devices 16u and 16w are turned off. Further, the semiconductor switching device 16u on the lower stage of the inverter main circuit 15B is turned on and the semiconductor switching devices 16v and 16w are turned off. As a result, a power supply current illustrated by a void arrow flows through the inverter main circuit 15B and the servo motor 3B.

Power-supply noise Nn and Np supplied together with the power supply current to the coils 31u, 31v, and 31w are illustrated in FIG. 2. The power-supply noise is based on abnormal variation of charges associated with the switching operation of each of the semiconductor switching devices 16u, 16v, and 16w. In FIG. 2, the power-supply noise Np caused by the servo motor 3A and the power-supply noise Nn caused by the servo motor 3B are illustrated while the generation timings are aligned.

The generation timing of the power-supply noise Np and the generation timing of the power-supply noise Nn are coincident and synchronized with each other and are reversed in positive/negative sign as illustrated in FIG. 2 because the phase difference of the half period is provided in the switching operation as described above.

In this process, at timing T1 before the power-supply noise Np and the power-supply noise Nn are generated, a current I(T1) flows from the capacitor C1 side toward the capacitor C2. In contrast, at timing T2 after the power-supply noise Np and the power-supply noise Nn are generated, a current I(T2) flows from the capacitor C2 side toward the capacitor C1.

[Behavior of Charges to Capacitor]

Behavior of the charges in the capacitors C involves cancellation of the leakage currents that are induced and transmitted on the ground E side of the capacitors C by the electrostatic induction from the difference between the potential applied to the servo motor 3 and the potential on the ground E side, and cancellation of the power-supply noise Np and the power-supply noise Nn. Thus, the behavior of the charges is described with reference to FIG. 3.

Figure 3:
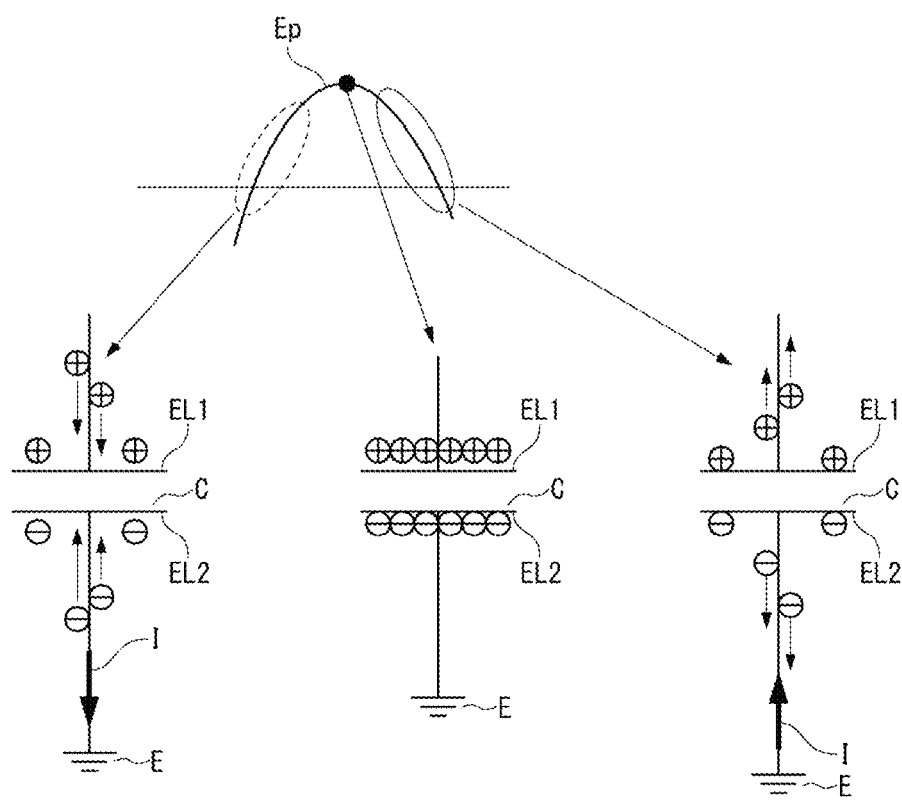
FIG. 3 is another diagram to explain the action canceling the noise by Embodiment 1.

As illustrated in FIG. 3, a process in which a power-supply side potential Ep of the AC voltage rises, reaches a peak, and falls, is assumed.

In a rising process (UP) of the potential Ep, the positive (+) charges are collected on an electrode EL1 on the power supply side of the capacitor C. The negative (−) charges are thus attracted to the positive charges on the power supply side, and the negative (−) charges are collected on an electrode EL2 on the ground E side of the capacitor C.

The current is movement (flow) of the charges, and the current flows in a direction opposite to a moving direction of the negative charges. Therefore, in the rising process of the potential Ep, the current I flows from the capacitor C toward the ground E.

Thereafter, rising of the potential is completed and the potential reaches a peak. The potential and the charges have proportional relationship. Therefore, increase of the positive (+) charges on the electrode EL1 side corresponding to the power supply side is stopped. When increase of the positive charges on the power supply side is stopped at this time, increase of the negative charges on the ground E side is also stopped. As described above, when rising of the potential is completed and the potential reaches the peak, movement of the charges is stopped and flow of the current is also stopped.

Finally, in a falling (DOWN) process of the potential Ep, the positive charges on the electrode EL1 side corresponding to the power supply side is decreased. When the positive charges on the power supply side is decreased, the negative charges on the ground E side is also decreased.

[Noise Cancellation based on Behavior of Charges to Capacitor]

Next, the action of noise cancellation based on the behavior of the charges to the capacitor as described above, is described with reference to FIG. 4.

Figure 4:
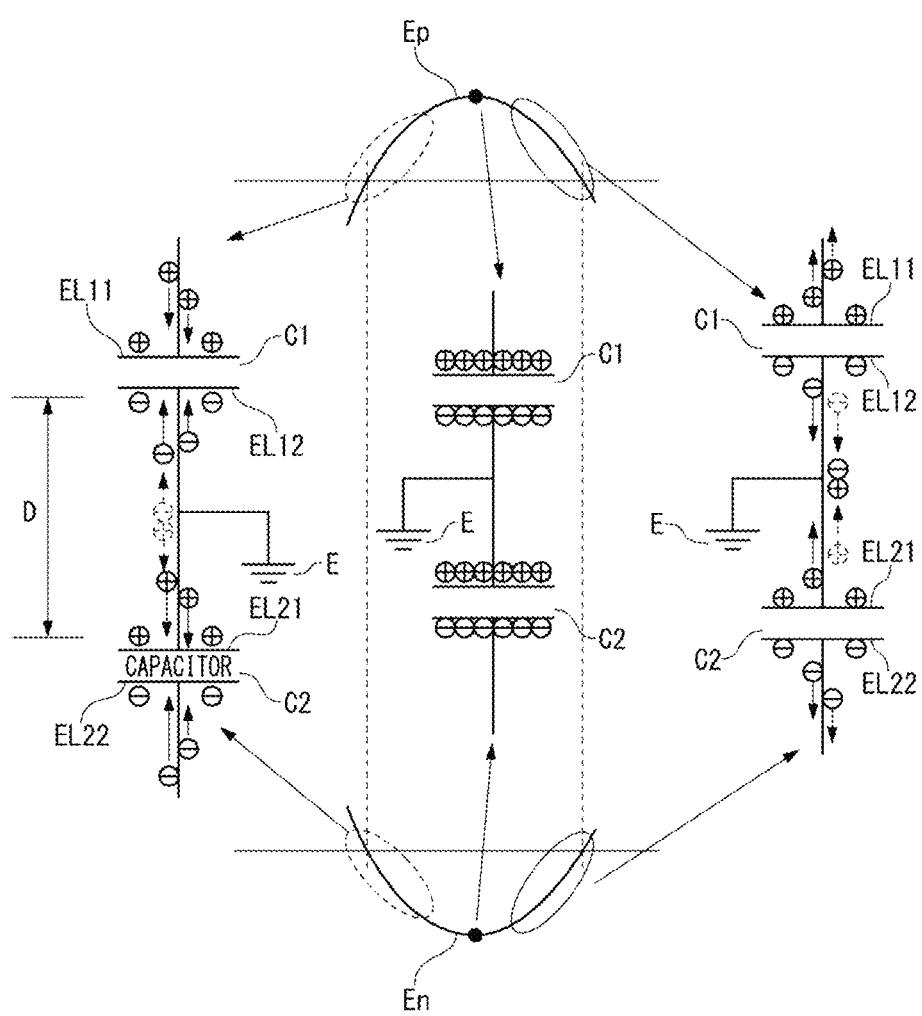
FIG. 4 is another diagram to explain the action canceling the noise by Embodiment 1.

In FIG. 4, the two potentials Ep and En on the power supply side are illustrated. One of the potentials is defined as a reference phase, and the other potential is delayed in phase by 180 degrees from the reference phase. The potentials are reversed in phase from each other. In this example, to clarify distinction of the potentials, description is given while the potential on the servo motor 3A side is regarded as the reference phase, and the potential on the servo motor 3B side is regarded as the other phase. Further, the number of capacitors C is equal to the number of gaps between the coils 31u, 31v, and 31w and the stator 32; however, the charges are induced by the electrostatic induction only in the capacitors C facing the coils 31u, 31v, and 31w energized through turning on of the semiconductor switching devices in the inverter main circuit 15. In FIG. 4, for simplification, the number of energized coils 31u, 31v, and 31w is one at each of the two potentials Ep and En on the power supply side, namely, the number of capacitors C in which the charges are induced by the electrostatic induction is one.

First, the servo motor 3A is in the rising process of the potential Ep, and the servo motor 3B is in the falling process of the potential En. At this time, the positive (+) charges are collected on an electrode EL11 on the power supply side of the capacitor C1 located between the servo motor 3A and the ground E, and the negative (−) charges are collected on an electrode EL12 on the ground E side. In contrast, the servo motor 3B is in the falling process of the potential En, the positive charges are collected on an electrode EL21 on the ground E side of the capacitor C2 located between the servo motor 3B and the ground E, and the negative charges are collected on an electrode EL22 on the power supply side.

Among the negative charges at the electrode EL21, a negative charge attracted to the electrode EL12 is illustrated by a dashed line.

At this time, in a distance D between the electrode EL12 and the electrode EL21 on the ground E side, potential difference and a potential are both zero because both of the electrode EL12 and the electrode EL21 are electrically grounded. Accordingly, no current normally flows between the electrode EL12 and the electrode EL21.

In the electrode EL12 and the electrode EL21, however, the charges, that are equivalent but are reversed in positive/negative sign derived from the potentials of the electrode EL11 and the electrode EL22 reversed in phase, are attracted and accumulated due to Coulomb force. Accordingly, when the potentials of the electrode EL11 and the electrode EL22 on the power supply side are changed with reversed phases, symmetric charge movement occurs between the electrode EL12 and the electrode EL21 on the ground E side.

In other words, for example, in a case where the potential of the electrode EL11 rises and the potential of the electrode EL22 equivalently falls, the voltage of the electrode EL22 on the power supply side falls by the amount same as the voltage rising in the electrode EL11 on the power supply side. At this time, as the positive (+) charges of the electrode EL11 are increased, the charges that have formed positive/negative pairs and have been balanced between the electrode EL12 and the electrode EL21 are separated by the increased amount of the positive (+) charges on the electrode EL11, and the negative (−) charges are attracted to the electrode EL12. At the same time, the negative (−) charges are increased on the electrode EL22 on the power supply side. Therefore, the positive (+) charges that have lost the negative (−) charges as the counterparts by being attracted by the positive (+) charges of the electrode EL11, are moved to the electrode EL21 side by being attracted by the negative (−) charges increased on the electrode EL22, and the positive (+) charges are increased on the electrode EL21.

At this time, since the potential Ep and the potential En are equivalently varied with reversed phases, no unstable charge that has lost the counterpart is present between the electrode EL12 and the electrode EL21, and the charges moving between the electrode EL12 and the electrode EL21 are not biased in positive/negative polarity. Accordingly, the charges do not flow out to the ground E, and the leakage current does not occur.

Thereafter, potential variation is completed and the potential reaches the peak in each of the servo motor 3A and the servo motor 3B. As a result, increase of the positive (+) charges in the electrode EL11 of the capacitor C1 is stopped, and increase of the negative (−) charges in the electrode EL12 is also stopped. Further, decrease of the positive (+) charges in the electrode EL22 of the capacitor C2 is stopped, and decrease of the negative (−) charges in the electrode EL21 is also stopped. The movement of the charges between the capacitor C1 and the capacitor C2 is thus stopped.

Finally, the servo motor 3A is in the falling process of the potential Ep, and the servo motor 3B is in the rising process of the potential En. At this time, the positive (+) charges are decreased from the electrode EL11 on the power supply side of the capacitor C1 located between the servo motor 3A and the ground E, and the negative (−) charges are decreased from the electrode EL12 on the ground E side. In contrast, in the servo motor 3B, the positive (+) charges are increased in the electrode EL22 on the power supply side of the capacitor C2 located between the servo motor 3B and the ground E, and the negative (−) charges are increased in the electrode EL 21 on the ground E side.

In the distance D between the electrode EL12 and the electrode EL22 on the ground E side, potential difference and a potential are both zero because both of the electrode EL12 and the electrode EL21 are electrically grounded. Accordingly, no current normally flows between the electrode EL12 and the electrode EL21. However, as with the case where the servo motor 3A is in the rising process of the potential Ep and the servo motor 3B is in the falling process of the potential En, no unstable charge that has lost the counterpart is present between the electrode EL12 and the electrode EL21, and the charges moving between the electrode EL12 and the electrode EL21 are not biased in positive/negative polarity. Accordingly, the charges do not flow out to the ground E, and the leakage current does not occur.

Figure 15:
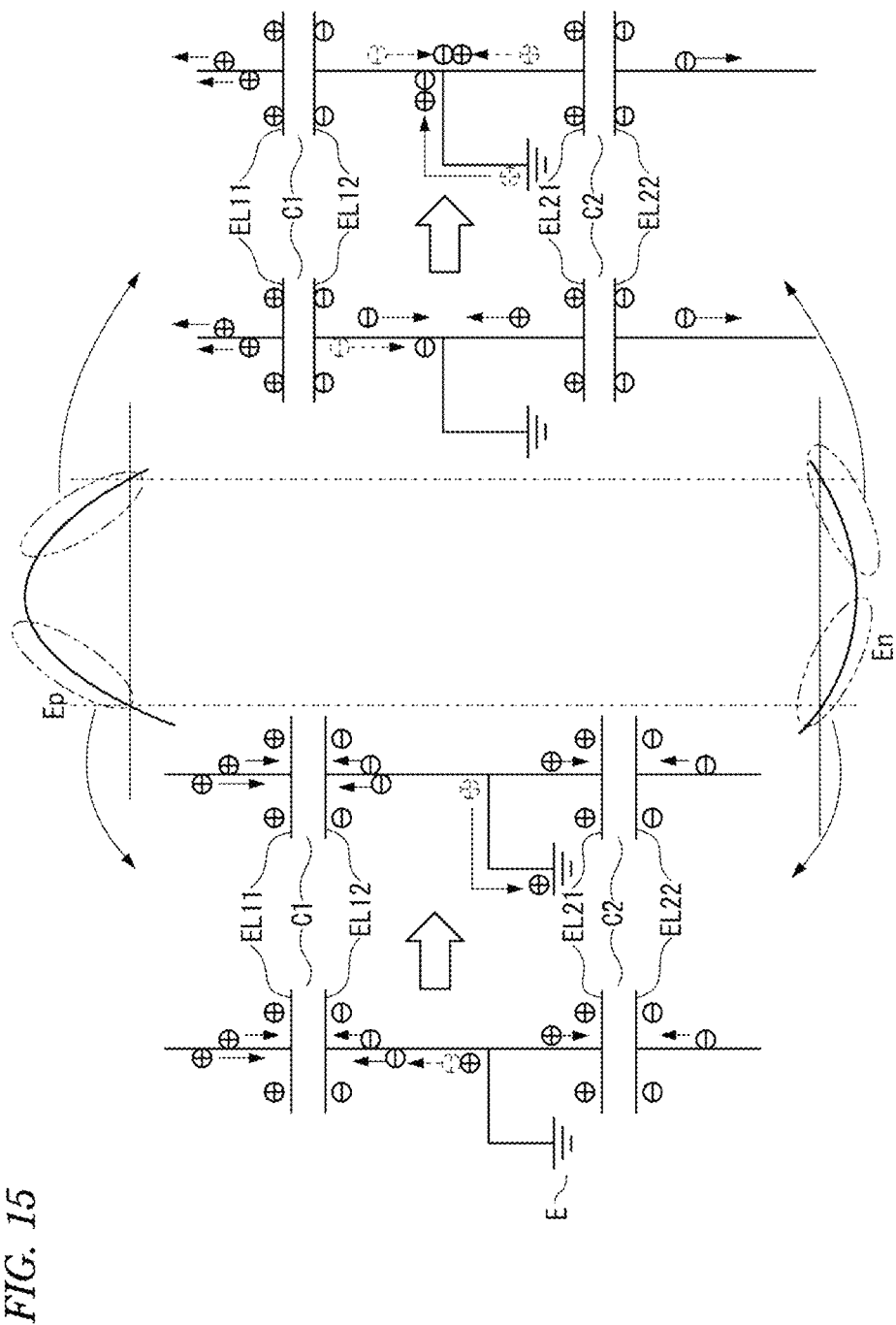
FIG. 15 is a diagram to explain action canceling noise in a case where a potential Ep and a potential En reversed in phase from each other are not equivalent and the potential is biased.

In contrast, a case where the potential Ep and the potential En reversed in phase are not equivalent and the potential is biased, is illustrated in, for example, FIG. 15. At this time, when a level (absolute value) of the potential Ep is larger than a level of the potential En, the positive (+) charges are increased in the electrode EL11 while the potential Ep rises. Accompanying therewith, the charges that have formed positive/negative pairs and have been balanced between the electrode EL12 and the electrode EL21 are separated, and the separated charges are moved to the electrode EL12 side. As a result, the negative (−) charges are increased in the electrode EL12.

When the potential Ep rises, the potential En falls at the same time. However, the level of the potential Ep is larger than the level of the potential En. Thus, a part of the positive (+) charges that has lost the negative (−) charges by being attracted by the positive (+) charges of the electrode EL11, is put into an unstable state without counterparts. As a result, the positive (+) charges that have lost the counterparts flow out to the ground E in search of the negative (−) charges.

Next, during fall of the potential Ep, the positive (+) charges are decreased from the electrode EL11, which releases the negative (−) charges of the electrode EL12. At the same time, the potential En falls, which releases the positive (+) charges attracted to the electrode EL21. However, since the level of the potential Ep is larger than the level of the potential En, the negative (−) charges released from the electrode EL12 become greater in amount than the positive (+) charges released from the electrode EL21. Accordingly, a part of the negative (−) charges released from the electrode EL12 are put into the unstable state without counterparts. As a result, the positive (+) charges flow from the ground E by being attracted by the negative (−) charges that have lost the counterparts. As described above, in the biased state where the potentials Ep and En are not equivalent, and one of the potentials is larger than the other potential, charges flows out to or flows from the ground E to generate a current, which causes the leakage current and the noise current.

In the present embodiment, the number of capacitors C is one at each of the two potentials Ep and En on the power supply side, namely, the number of capacitors C in which the charges are induced by the electrostatic induction is one. In the present invention, however, similar effects are achievable as long as the number of capacitors C in which the charges are induced by the electrostatic induction is the same, at the two potentials Ep and En on the power supply side. This includes the following two modes, and one of the modes is selected.

Mode 1: The number of semiconductor switching devices turned on on the high potential side among the semiconductor switching devices in the inverter main circuit 15A of the servo motor 3A and the number of semiconductor switching devices turned on on the low potential side in the inverter main circuit 15B of the servo motor 3B are equal to each other.

Mode 2: The number of semiconductor switching devices turned on on the low potential side among the semiconductor switching devices in the inverter main circuit 15A of the servo motor 3A and the number of semiconductor switching devices turned on on the high potential side in the inverter main circuit 15B of the servo motor 3B are equal to each other.

Further, even in a case where the number of capacitors C in which the charges are induced by the electrostatic induction is different at the two potentials Ep and En on the power supply side, it is enough that the sum of the charges induced in the three capacitors C that are stray capacitances between the phase coils (31u, 31v, and 31w) and the stator of the servo motor 3A and the sum of the charges induced in the three capacitors C that are stray capacitances between the phase coils (31u, 31v, and 31w) and the stator of the servo motor 3B are the same as each other.

In other words, it is enough that the sum of the charges canceled in positive/negative polarity by the positive (+) charges and the negative (−) charges induced in the three capacitors C of the servo motor 3A and the sum of the charges canceled in positive/negative polarity by the positive (+) charges and the negative (−) charges induced in the three capacitors C of the servo motor 3B are the same as each other.

More specifically, for example, Case 2 or Case 3 falls under the same with respect to Case 1 described below. Even in the following cases, effects similar to the effects in the case where the number of capacitors C in which the charges are induced by the electrostatic induction is the same at the two potentials Ep and En on the power supply side, are achievable.

Case 1: Among the capacitors C of the servo motor 3A, the number of capacitors C in which the negative (−) charges are induced on the ground E side is two, and the number of capacitors C in which the positive (+) charges are induced on the ground E side is one.

Case 2: In the servo motor 3B, the number of capacitors C in which the negative (−) charges are induced on the ground E side is one, and the number of capacitors C in which the positive (+) charges are induced on the ground E side is two.

Case 3: In the servo motor 3B, the number of capacitors C in which the negative (−) charges are induced on the ground E side is zero, and the number of capacitors C in which the positive (+) charges are induced on the ground E side is one.

In this case, the capacitor C in which the negative (−) charges are induced on the ground E side is obtainable by turning on any of the semiconductor switching devices 16u, 16v, and 16w on the high potential side of the corresponding coils 31u, 31v, and 31w. The capacitor C in which the positive (+) charges are induced on the ground E side is obtainable by turning on any of the semiconductor switching devices 16u, 16v, and 16w on the low potential side of the corresponding coils 31u, 31v, and 31w. Note that, to avoid short circuit of the electric circuit, the semiconductor switching devices 16u, 16v, and 16w on the low potential side connected to the coils 31u, 31v, and 31w in which the semiconductor switching devices 16u, 16v, and 16w on the high potential side are turned on, are turned off. For example, in FIG. 5, the semiconductor switching device 16u that is illustrated on the upper stage of the figure and supplies the voltage $+V_E$ to the coil 31u is turned on, the semiconductor switching device 16u that is illustrated on the lower stage of the figure and supplies the voltage $-V_E$ to the coil 31u is turned off. Likewise, the semiconductor switching devices 16u, 16v, and 16w on the high potential side that are illustrated on the upper stage of the figure and are connected to the coils 31u, 31v, and 31w in which the semiconductor switching devices 16u, 16v, and 16w on the low potential side illustrated on the lower stage of the figure are turned on, are turned off as a matter of course.

Further, in the case where the number of capacitors C in which the charges are induced by the electrostatic induction is different at the two potentials Ep and En on the power supply side, it is as below.

It is most preferable that the sum of the charges induced in the three capacitors C that are stray capacitances between the phase coils (31u, 31v, and 31w) and the stator of the servo motor 3A and the sum of the charges induced in the three capacitors C that are stray capacitances between the phase coils (31u, 31v, and 31w) and the stator of the servo motor 3b be the same as each other.

However, in a case where the sum of the charges induced in the three capacitors C of the servo motor 3A and the sum of the charges induced in the three capacitors C of the servo motor 3b are not same as each other, it is possible to reduce the noise by controlling the semiconductor switching devices 16u, 16v, and 16w of each of the servo motor 3A and the servo motor 3B such that the sum of the charges induced in the three capacitors C of the servo motor 3A and the sum of the charges induced in the three capacitors C of the servo motor 3b are reversed in positive/negative sign.

For example, Case 5, Case 6, or Case 7 corresponds to Case 4 described below. In other words, a part of the charges (noise current) that are induced in the capacitors C of one of the servo motors and flow out to the ground E can be canceled and reduced by forming positive/negative pairs with the charges reversed in positive/negative sign induced in the capacitors C of the other servo motor. This makes it possible to reduce noise flowing out to the ground E.

Case 4: Among the capacitors C of the servo motor 3A, the number of capacitors C in which the negative (−) charges are induced on the ground E side is two, and the number of capacitors C in which the positive (+) charges are induced on the ground E side is one.

Case 5: In the servo motor 3B, the number of capacitors C in which the negative (−) charges are induced on the ground E side is zero, and the number of capacitors C in which the positive (+) charges are induced on the ground E side is two.

Case 6: In the servo motor 3B, the number of capacitors C in which the negative (−) charges are induced on the ground E side is zero, and the number of capacitors C in which the positive (+) charges are induced on the ground E side is one.

Case 7: In the servo motor 3B, the number of capacitors C in which the negative (−) charges are induced on the ground E side is one, and the number of capacitors C in which the positive (+) charges are induced on the ground E side is one.

Embodiment 2

Next, Embodiment 2 is described with reference to FIG. 5 to FIG. 7.

In Embodiment 2, it is assumed that the AC currents of reversed phases are supplied to the servo motor 3A and the servo motor 3B, as with Embodiment 1. Embodiment 2 discloses a specific method of supplying the currents to the servo motor 3A and the servo motor 3B that are opposite in winding direction of the coils.

Embodiment 2 includes Embodiment 2-1 and Embodiment 2-2 that are subsequently described below. Note that FIG. 5 to FIG. 7 each illustrate only a main part of the motor driving apparatus 10.

Embodiment 2-1

Figure 5:
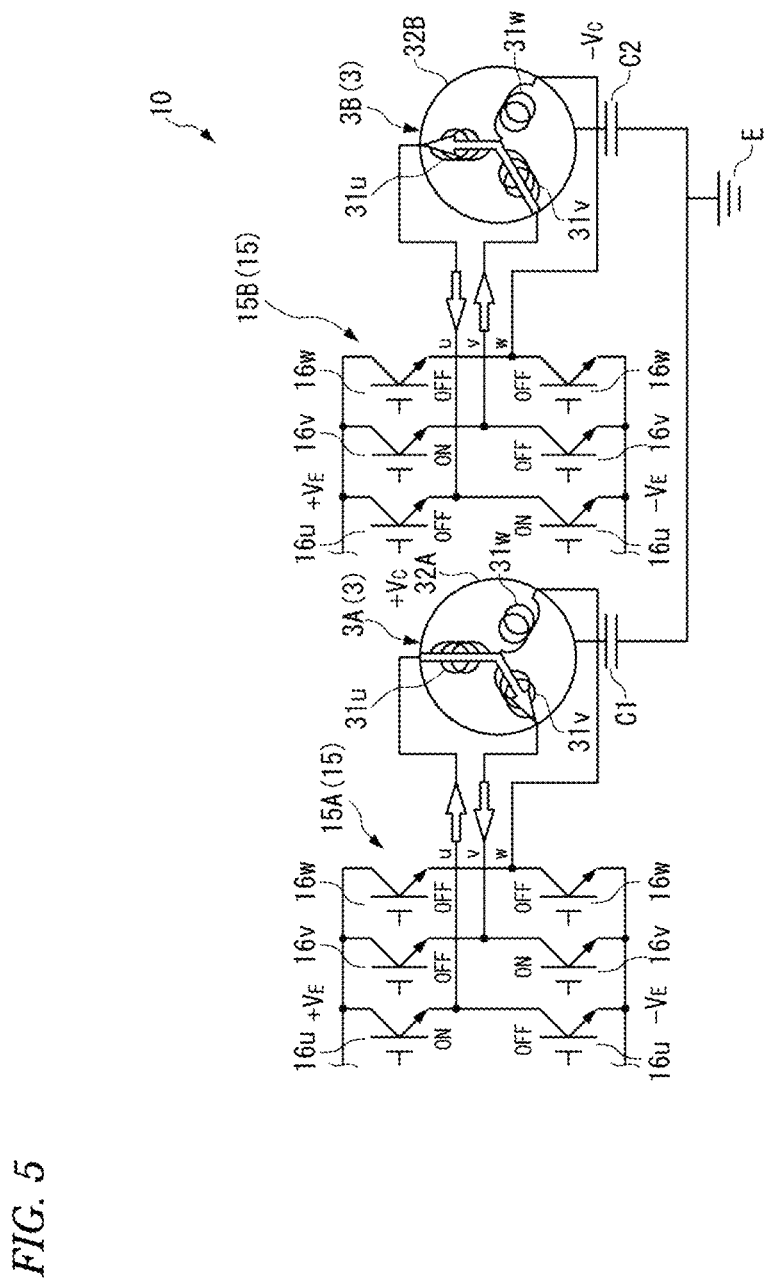
FIG. 5 is a block diagram illustrating a main part of a motor driving apparatus according to Embodiment 2-1 of the present invention.

In Embodiment 2-1, as illustrated in FIG. 5, the servo motor 3A uses the left-winding coils 31u, 31v, and 31w, and the servo motor 3B uses the right-winding coils 31u, 31v, and 31w. In other words, the winding direction of the coils 31u, 31v, and 31w of the servo motor 3A and the winding direction of the coils 31u, 31v, and 31w are reversed from each other. Accordingly, in the following, the servo motor 3A is referred to as the left-winding servo motor 3A, and the servo motor 3B is referred to as the right-winding servo motor 3B. Except for the winding direction of the coils, a configuration of Embodiment 2-1 is similar to the configuration of Embodiment 1. In particular, the stator 32A of the servo motor 3A and the stator 32B of the servo motor 3B are in electrical continuity through the conductor 33.

In Embodiment 2-1, the currents in opposite directions are supplied to the left-winding servo motor 3A and the right-winding servo motor 3B. In FIG. 5, as an example in which the currents in opposite directions are supplied, the current flows through the servo motor 3A in a direction from u-phase to v-phase, and the current flows through the servo motor 3B in a direction from v-phase to u-phase. In FIG. 5, the currents are each illustrated by a void arrow.

When the currents in opposite directions are supplied to the left-winding servo motor 3A and the right-winding servo motor 3B as described above, magnetic field in the same direction is generated on the coils 31u, 31v, and 31w of the servo motor 3A and the coils 31u, 31v, and 31w of the servo motor 3B. Accordingly, although the switching operation of the semiconductor switching devices 16u, 16v, and 16w to the servo motor 3A and the switching operation of the semiconductor switching devices 16u, 16v, and 16w to the servo motor 3B are reversed in phase, motor torque in the same direction occurs on the servo motor 3A and the servo motor 3B.

In the above description, the direction from u-phase to v-phase and the direction from v-phase to u-phase are described as the example of supplying the currents in the opposite directions; however, this is merely an example, and the number of patterns of supplying the currents in the opposite directions is the same as the number of combinations of the windings supplying the currents, namely, the number of combinations of phases. The patterns are specifically described below.

A direction from u-phase to w-phase and a direction from w-phase to u-phase.

A direction from v-phase to w-phase, and a direction from w-phase to v-phase.

Embodiment 2-2

Next, Embodiment 2-2 is described with reference to FIG. 6.

A configuration in Embodiment 2-2 is the same as the configuration in Embodiment 2-1 except that the current is supplied to all of the left-winding coils 31u, 31v, and 31w and the right-winding coils 31u, 31v, and 31w.

In Embodiment 2-2, the currents in opposite directions are supplied to the left-winding servo motor 3A and the right-winding servo motor 3B. In FIG. 6, as an example in which the currents in opposite directions are supplied, the current flows through the servo motor 3A in a direction from (u-phase and w-phase) to v-phase, and the current flows through the servo motor 3B in a direction from v-phase to (u-phase and w-phase).

Since the currents in opposite directions are supplied to the left-winding servo motor 3A and the right-winding servo motor 3B as described above, motor torque in the same direction occurs on the servo motor 3A and the servo motor 3B also in Embodiment 2-2, which causes rotation in the same direction.

Figure 6:
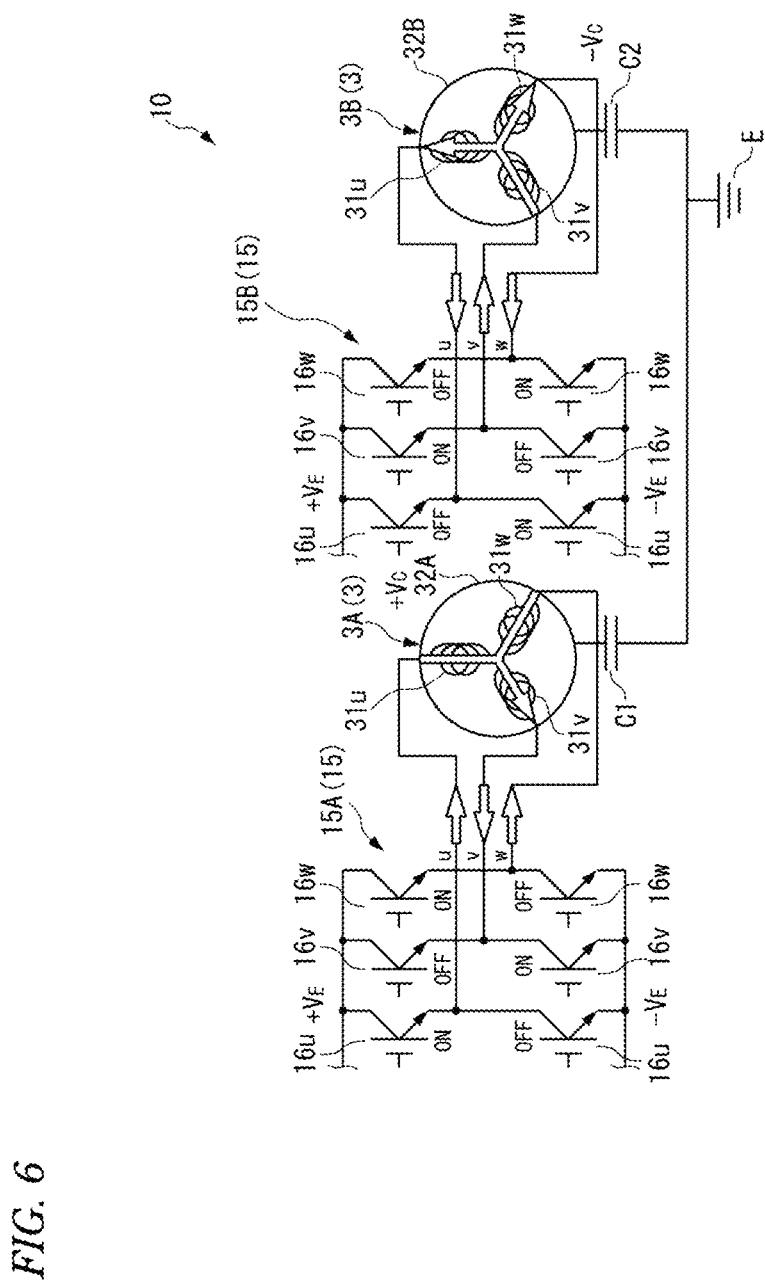
FIG. 6 is a block diagram illustrating a main part of a motor driving apparatus according to Embodiment 2-2 of the present invention.
Figure 7:
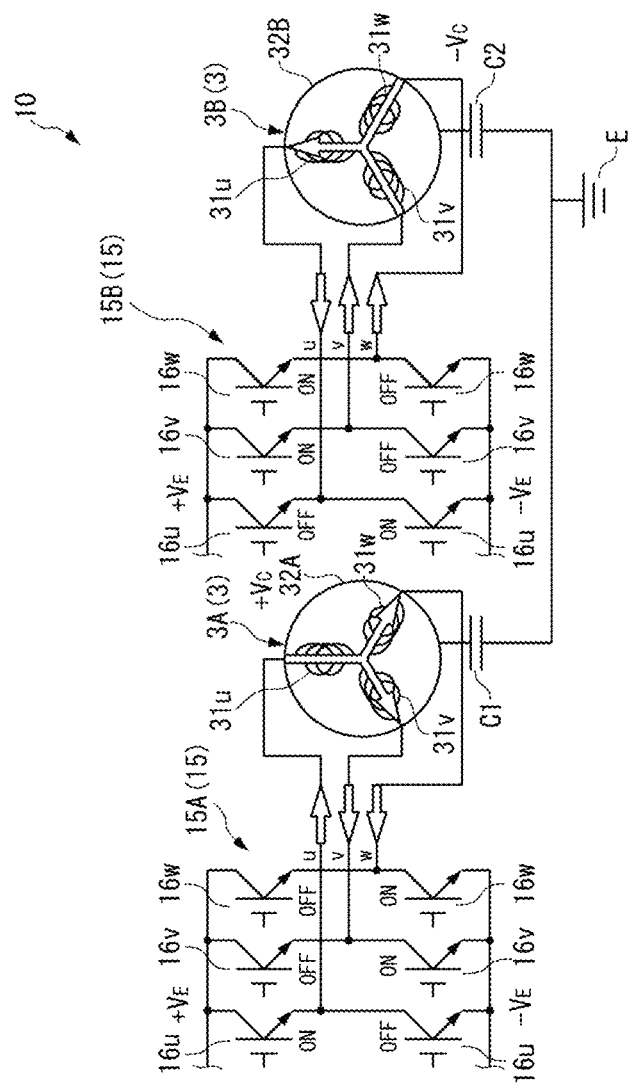
FIG. 7 is a block diagram illustrating the main part of the motor driving apparatus according to Embodiment 2-2 of the present invention.

Although the combination of the direction from (u-phase and w-phase) to v-phase and the direction from v-phase to (u-phase and w-phase) has been illustrated in FIG. 6, the embodiment is applicable to a combination of a direction from u-phase to (v-phase and w-phase) and a direction from (v-phase and w-phase) to u-phase illustrated in FIG. 7, and to an unillustrated combination of a direction from w-phase to (u-phase and v-phase) and a direction from (u-phase and v-phase) to w-phase.

Embodiment 3

Next, Embodiment 3 according to the present invention is described.

Figure 8:
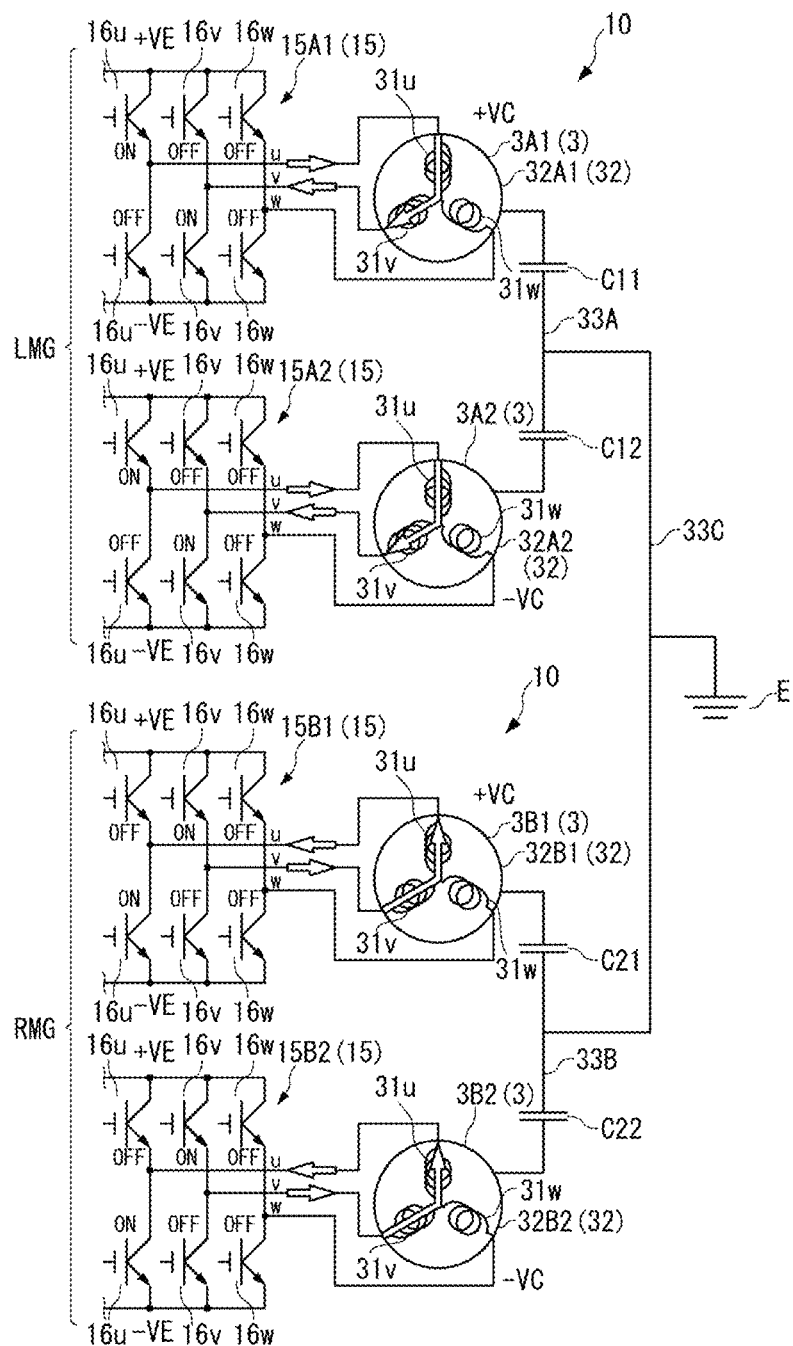
FIG. 8 is a block diagram illustrating a main part of a motor driving apparatus according to Embodiment 3 of the present invention.

As illustrated in FIG. 8, a configuration of Embodiment 3 is the same as the configuration of each of Embodiment 1 and Embodiment 2 in that a first servo motor group LMG and a second servo motor group RMG synchronously controlled are provided. However, the number N of individual servo motors 3 included in each of the first servo motor group and the second servo motor group is one in Embodiment 1 and in Embodiment 2, whereas the number N of individual servo motors 3 in each of the first servo motor group LMG and the second servo motor group RMG is two in Embodiment 3. In the following, Embodiment 3 is specifically described with reference to FIG. 8.

As illustrated in FIG. 8, the first servo motor group LMG includes a left-winding servo motor 3A1 and a left-winding servo motor 3A2. The servo motor 3A1 and the servo motor 3A2 each have the configuration same as the configuration of the servo motor 3A in Embodiment 2, and inverter main circuits 15A1 and 15A2 respectively corresponding to the servo motor 3A1 and the servo motor 3A2 each have the configuration same as the configuration of the inverter main circuit 15A in Embodiment 2.

In the first servo motor group LMG, a stator 32A1 of the servo motor 3A1 and a stator 32A2 of the servo motor 3A2 are in electrical continuity through an electrical conductor 33A. As the stray capacitance component, a capacitor C11 and a capacitor C12 are illustrated on the conductor 33A.

Further, as illustrated in FIG. 8, the second servo motor group RMG includes a right-winding servo motor 3B1 and a right-winding servo motor 3B2. The servo motor 3B1 and the servo motor 3B2 each have the configuration same as the configuration of the servo motor 3B in Embodiment 2, and inverter main circuits 15B1 and 15B2 respectively corresponding to the servo motor 3B1 and the servo motor 3B2 each have the configuration same as the configuration of the inverter main circuit 15 in Embodiment 2.

In the second servo motor group RMG, a stator 32B1 of the servo motor 3B1 and a stator 32B2 of the servo motor 3B2 are in electrical continuity through an electrical conductor 33B. As the stray capacitance component, a capacitor C21 and a capacitor C22 are illustrated on the conductor 33B.

The conductor 33A of the first servo motor group LMG and the conductor 33B of the second servo motor group RMG are in electrical continuity through an electrical conductor 33C. Accordingly, the stator 32A1 of the servo motor 3A1, the stator 32A2 of the servo motor 3A2, the stator 32B1 of the servo motor 3B1, and the stator 32B2 of the servo motor 3B2 are in electrical continuity with one another. The conductor 33C is connected to the ground E.

In Embodiment 3, the currents in opposite directions are supplied to the left-winding first servo motor group LMG and the right-winding second servo motor group RMG. In FIG. 8, as an example in which the currents in opposite directions are supplied, the current flows through the servo motor 3A1 and the servo motor 3A2 in a direction from u-phase to v-phase, and the current flows through the servo motor 3B1 and the servo motor 3B2 in a direction from v-phase to u-phase.

When the currents in opposite directions are supplied to the left-winding first servo motor group LMG and the right-winding second servo motor group RMG as described above, magnetic field in the same direction is generated on the coils $31u$, $31v$, and $31w$ of the servo motors 3A1 and 3A2 and on the coils $31u$, $31v$, and $31w$ of the servo motors 3B1 and 3B2. Accordingly, although the switching operation of the semiconductor switching devices $16u$, $16v$, and $16w$ to the servo motors 3A1 and 3A2 and the switching operation of the semiconductor switching devices $16u$, $16v$, and $16w$ to the servo motors 3B1 and 3B2 are reversed in phase, motor torque in the same direction occurs on the servo motors 3A1 and 3A2 and the servo motors 3B1 and 3B2.

In Embodiment 3, since the switching operation to the servo motors 3A1 and 3A2 and the switching operation to the servo motors 3B1 and 3B2 are reversed in phase, the AC currents of reversed phases are supplied to the servo motors 3A1 and 3A2 and the servo motors 3B1 and 3B2.

[Effects]

Effects achieved by Embodiment 1 to Embodiment 3 described above are described.

According to the present embodiments, to cancel the leakage current by the first motor group, the leakage current by the second motor group is used. The leakage current is generated by supplying, to the second motor group, the current reversed in phase from the current supplied to the first motor group. This suggests that the present embodiments make it possible to cancel the leakage current by the first motor group and the leakage current by the second motor group without providing, for example, the leakage current detection unit necessary in Patent Literature 3.

The leakage currents canceled by each other in the present embodiments are currents induced by the driving currents that are supplied to the first motor group and the second motor group at the same time. Accordingly, the leakage currents canceled by each other are generated at the same time without any shift. This makes it possible to reliably cancel the leakage currents.

The motor driving apparatus 10 according to the present embodiments is particularly effective to a servo motor to which a large voltage is supplied. Examples thereof include an injection molding machine that includes a plurality of servo motors, the driving voltage of which exceeds 200 V, and synchronously controls and uses the plurality of servo motors. In particular, the motor driving apparatus 10 is effective to an injection molding machine including a pair of servo motors that are provided at positions symmetric with respect to a center axis of a moving body and are synchronously controlled.

Specific examples thereof include the servo motors (10) that move the injection screws forward/backward disclosed in Patent Literature 1, and the mold opening/closing servo motors (27) of the mold clamping apparatus disclosed in Patent Literature 2. The pair of servo motors (10) disclosed in Patent Literature 1 are axially symmetrically assembled to the housing (7), and the pair of mold opening/closing servo motors (27) disclosed in Patent Literature 2 are axially symmetrically assembled to a stationary platen (1).

Further, as the other application in which an even number of servo motors are operated in the same phase in the injection molding machine, split-nut opening/closing motors used in a mold clamping apparatus, and hydraulic-pump driving motors are exemplified. Further, for example, the motor driving apparatus 10 is applicable to a dual-winding motor in which one coil 31u is configured by two windings, and a quad-winding motor in which one coil 31u is configured by four windings, as a motor form.

Since the electrically-driven injection molding machine includes the plurality of servo motors, the driving voltage of which exceeds 200 V, switching of the inverter circuit by the high-potential circuit causes large noise. Further, it is necessary for the injection molding machine to operate a heavy object such as the mold clamping apparatus and the injection apparatus without inclination. Therefore, the injection molding machine includes a plurality of actuators driven by a pair of large servo motors that are provided at both ends (upper and lower ends, or right and left ends) of a moving object, are symmetrically arranged with respect to a center axis, and are synchronously controlled. Further, these pairs of servo motors synchronously controlled have the same specification (for example, same size, same capacity, and same standard) in order to operate the heavy object without inclination and facilitate control. Servo amplifiers (inverter circuits) controlling the respective servo motors also have the same specification. Accordingly, the electric circuit of the motor has a combination of the same circuits arranged in parallel. Since the pair of inverter circuits that are supplied with the same voltage at the same time and have the same specification are synchronously controlled, the switching noise also has extremely approximate noise forms (noise waveforms). The present embodiments can reduce the leakage current and the noise in the injection molding machine driven by the pair of servo motors driven at the high potential, with eliminating necessity of complicated compensation control and addition of a new compensation apparatus.

Further, a large number of injection molding machines are often installed in the same factory building. Therefore, if switching noise generated from a servo motor of one of the injection molding machines flows into the other adjacent injection molding machine through the ground earth, the switching noise may cause not only malfunction to impair productivity but also breakage of a main body of the injection molding machine and a mold.

Although the preferred embodiments of the present invention have been described above, the present invention allows the following modifications and applications.

In Embodiment 1 to Embodiment 3, the combination of the left-winding servo motor and the right-winding servo motor has been described. This is equivalent to a state where the phases of the coils generating magnetic fields are shifted by 180 degrees. In other words, the present invention encompasses the following combinations, in addition to the case where one set of the motor group including one left-winding servo motor and the motor group including one right-winding servo motor is provided.

Even in a combination of the first motor group including the left-winding servo motor and the second motor group including the left-winding servo motor, it is enough that the position of the first stator of the first motor group and the second stator of the second motor group are shifted by 180 degrees from each other in magnetic field angle. When the assembled position of the first stator and the assembled position of the second stator are shifted as described above, effects equivalent to the effects by the combination of the motor group including one left-winding servo motor and the motor group including one right-winding servo motor, are achievable. This is true of a combination of the first motor group including the right-winding servo motor and the second motor group including the right-winding servo motor.

For example, when the number of poles of the servo motor is N, the magnetic field angle of 180 degrees corresponds to a rotation angle of the actual motor rotor of 180×2/N (degrees).

Further, most of the switching noise is generated in a transition period when the semiconductor switching device is switched from OFF to ON or ON to OFF. The direct cause of noise reduction is simultaneous switching of positive/negative polarity symmetrically between the two servo motors 3 in a state where there is a phase difference of 180 degrees in the magnetic field angle.

In Embodiment 1 to Embodiment 3, the servo motor 3 that includes one set of the coils 31u, 31v, and 31w has been described as an example. However, even when the present invention is applied to the servo motor 3 that includes an even number of sets, for example, two sets or four sets of the coils 31u, 31v, and 31w, effects equivalent to the effects by the servo motor 3 including one set of the coils 31u, 31v, and 31w are achievable.

For example, in a case where one servo motor 3 includes two sets of the coils 31u, 31v, and 31w, the coils (α) in one of the sets are each configured by a left-winding coil, and the coils (β) in the other set are each configured by a right-winding coil. Further, the currents with phase difference of 180 degrees are supplied to the coils (α) and the coils (β).

Likewise, for example, instead of where the coils (α) in one of the sets are each configured by a left-winding coil, and the coils (β) in the other set are each configured by a right-winding coil, the positions where the coils (α) are assembled to the stator 32 and the positions where the coils (β) are assembled to the stator 32 are shifted by 180 degrees in magnetic field angle. The assembled positions indicate arrangement and order in a circumferential direction of the windings of the coils 31u, 31v, and 31w in each phase.

A uvw power cable that supplies the current generated by the inverter main circuit 15 is bundled with each of the above-described two sets of coils 3, which makes it possible to further reduce the noise. The uvw power cable is an electrical conductor that electrically couples the inverter circuit and stator coils.

To tightly bundle the cable, the u-wire (R) of the right-winding coil 3 and the u-wire (L) of the left-winding coil 3 are bundled, the v-wire (R) of the right-winding coil 3 and the v-wire (L) of the left-winding coil 3 are bundled, and the w-wire (R) of the right-winding coil 3 and the w-wire (L) of the left-winding coil 3 are bundled. As a result, magnetic fluxes are mutually canceled between the u-wire (R) and the u-wire (L), between the v-wire (R) and the v-wire (L), and between the w-wire (R) and the w-wire (L), which makes it possible to further reduce the noise.

This is because the currents having the same waveform flows through, for example, the u-wire (R) and the u-wire (L) in the opposite directions. This is true of the v-wire (R) and the v-wire (L), and the w-wire (R) and the w-wire (L).

Figure 9:
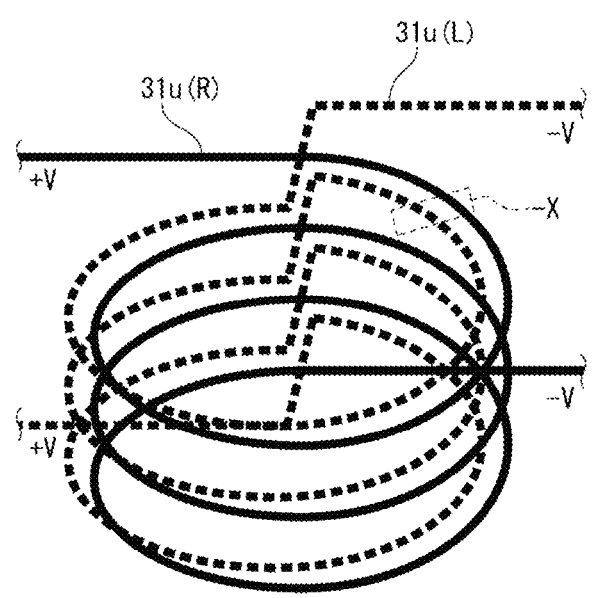
FIG. 9 is a perspective view illustrating a preferable coil of a three-phase AC motor according to the present embodiments.
Figure 10:
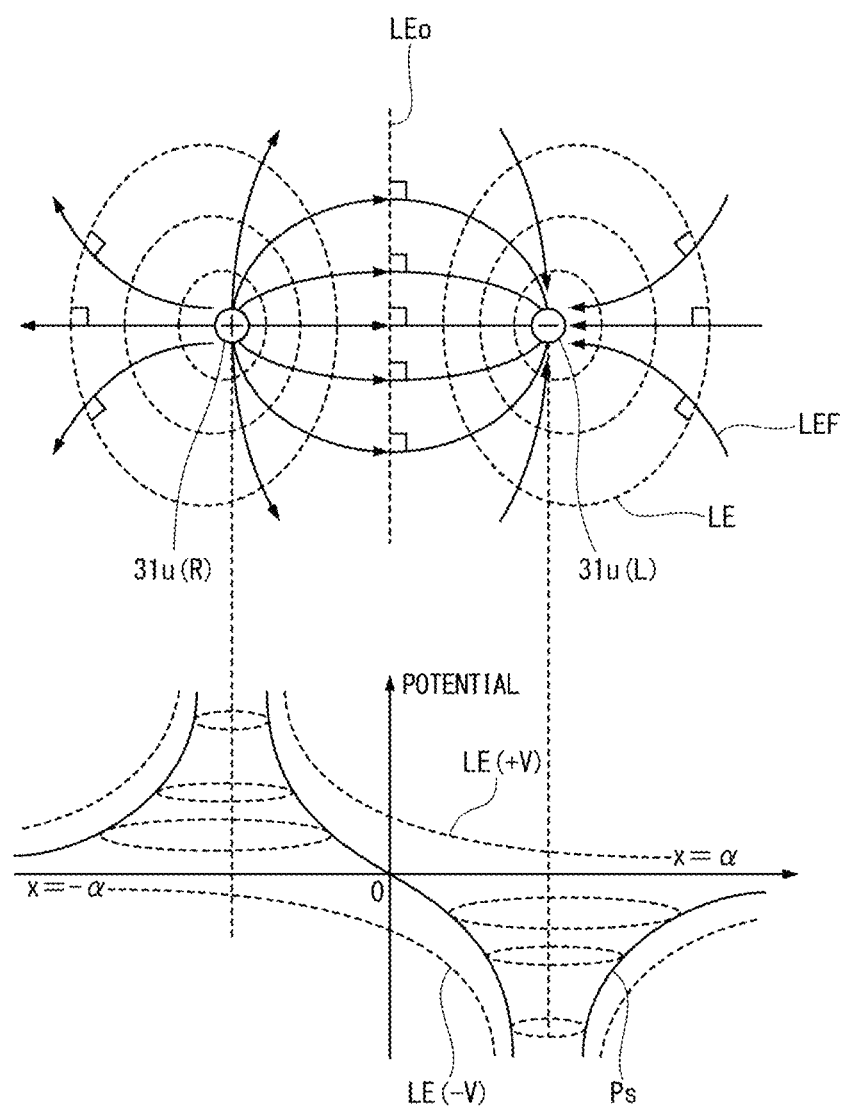
FIG. 10 is a diagram to explain a potential around the coil in a cross-section X of FIG. 9.

Further, in the dual-winding motor in which one coil 31 is configured by two windings, for example, one coil 31$u$(R) is configured by a right-winding coil, the other coil 31$u$(L) is configured by a left-winding coil, and both of the coils 31$u$(R) and 31$u$(L) are preferably coaxially wound, as illustrated in FIG. 9. As a result, as illustrated in FIG. 10, the potential of the coil 31$u$(R) and the potential of the coil 31$u$(L) respect to the ground E (stator) are symmetric in positive/negative polarity. This makes it possible to bring a combined electric potential around the coils close to about 0 V. Accordingly, it is possible to reduce the leakage current and the noise current that are induced on the ground E side by electrostatic induction caused by potential difference between the winding side and the ground E side and are then transmitted.

In an upper diagram of FIG. 10, LEo denotes equipotential lines at the potential of 0 V, LEF denotes electric lines of force, and LE denotes equipotential lines, and the electric lines of force LEF and the equipotential lines LE are orthogonal to each other. Further, in a lower diagram of FIG. 10, Ps denotes a combined electric potential.

This is true of the coils 31$v$ and 31$w$ in the dual-winding motor.

Further, this is true of the four-winding motor in which one coil is configured by four windings. For example, two right-winding coils 31$u$(R1) and 31$u$(R2) and two left-winding coils 31$u$(L1) and 31$u$(L2) are preferably arranged in order of the coil 31$u$(R1), the coil 31$u$(L1), the coil 31$u$(R2) and the coil 31$u$(L2) and are preferably coaxially wound.

This is true of the coils 31$v$ and 31$w$ in the four-winding motor.

To accurately supply the currents of reversed phases to the plurality of synchronous servo motors 3 to synchronize the switching timing of the inverter main circuits 15, reference time is preferably aligned among motor drives by a known method. For example, each of the motor drives is connected in series to one host computer that can control the inverter main circuits 15, through a serial interface. As the serial interface, a serial interface that has a function to perform time synchronization of the connected motor drives, for example, a serial interface based on network time synchronization protocol such as IEEE-802.1AS can be used.

Further, the reference time among the plurality of synchronous motor drives may be synchronized by feeding back and exchaging phase information on a reference clock among the plurality of synchronous motor drives, and using PLL (phase lock loop) algorism.

Further, the plurality of inverter circuits to be synchronized may be controlled based on a reference time by one motor drive.

Further, the case where the power is supplied to the three-phase AC motors has been described above; however, the present invention may be applied to power regeneration that occurs when the three-phase AC motors are decelerated or to a case where the three-phase AC motors are used as generators. This is because, in the case where the power is supplied to the three-phase AC motors and the case where the current is supplied from the three-phase AC motors during power regeneration or during power generation, ON/OFF control of the semiconductor switching devices 16$u$, 16$v$, and 16$w$ of the inverter circuit are similarly performed and noise caused by switching ON/OFF of the switching devices 16$u$, 16$v$, and 16$w$ is similarly generated, except that the current direction is opposite from the current direction in the case where the three-phase AC motors are used as motors (actuators).

Further, the case of a two-level inverter based on a simple method of turning on/off the DC power supply voltage has been described above for simplification. However, this is illustrative, and the present invention may be applied to a three-level inverter based on a method that is frequently used for VVVF (variable voltage variable frequency) control of large power and is a circuit method supplying a voltage of an midpoint level of the power supply in order to use a device with low withstand voltage. The switching element group of the three-level inverter includes a switching element opened in circuit on midpoint potential side that is further added to each of the switching device opened in circuit on high potential side and the switching device opened in circuit on low potential side.

The two-level inverter only includes one set of semiconductor switching devices 16$u$, 16$v$, and 16$w$ on each of the high potential side and the low potential side. Accordingly, there is a case where any of the semiconductor switching devices 16$u$, 16$v$, and 16$w$ of the inverter circuit on one potential side, for example, the semiconductor switching device 16$u$ is turned on to cause the midpoint potential. In this case, to avoid short circuit, the semiconductor switching device 16$u$ on the other potential side is surely turned off to prevent the current from flowing.

In contrast, as for the semiconductor switching devices of the uvw phases on the high potential side or the low potential side in the three-level converter, two semiconductor switching device 16$u$ and 16$u'$ not illustrated, 16$v$ and 16$v'$ not illustrated, and 16$w$ and 16 W' not illustrated are connected in series. Accordingly, two sets of semiconductor switching devices of the uvw phases are provided. Therefore, even when any of the semiconductor switching devices 16$u$, 16$v$, and 16$w$ of one potential side, for example, the semiconductor switching device 16$u$ is turned on to cause the midpoint potential, short-circuit does not occur unless the semiconductor switching device 16$u'$ is turned on. Therefore, it is possible to selectively use the case where the current flows through the coil 31$u$ and the case where the current does not flow through the coil 31$u$ based on whether to turn on or off the semiconductor switching device 16$u'$. Even in this case, options of the potential in the three-level inverter are still three ways of the high potential, the midpoint potential, and the low potential same as those in the two-level inverter. Therefore, the noise can be similarly reduced. Further, in the three-level inverter, the switching device groups can be combined and easily controlled by separating the case where the current at the midpoint potential flows and the case where the current does not flow.

REFERENCE SIGNS LIST

1 Three-phase AC power supply
3, 3A, 3B, 3A1, 3A2, 3B1, 3B2 Servo motor
10 Motor driving apparatus
11 Rectifier
13 Smoothing capacitor
15, 15A, 15B, 15A1, 15A2, 15B1, 15B2 Inverter main circuit
16$u$, 16$v$, 16$w$ Semiconductor switching device
17 Inverter control unit
20, 20A, 20B Inverter circuit
31, 31$u$, 31$v$, 31$w$ Coil
32, 32A, 32A1, 32A2, 32B, 32B1, 32B2 Stator
33, 33A, 33B, 33C Electrical Conductor
C, C1, C11, C12, C2, C21, C22 Capacitor
D Distance
E Ground EL1, EL11, EL12, EL2, EL21, EL22 Electrode
LMG First servo motor group
RMG Second servo motor group

The invention claimed is:

1. A motor driving apparatus, comprising:
a first motor group including a number N of individual first three-phase AC motors;
a second motor group including a number N of individual second three-phase AC motors;
an electrical conductor that connects first stators of the first three-phase AC motors and second stators of the second three-phase AC motors and is grounded; and
a control unit configured to control driving of the first three-phase AC motors and the second three-phase AC motors, wherein
the control unit includes a first switching element group including first switching elements to independently control AC currents of respective phases of the first three-phase AC motors, and a second switching element group including second switching elements to independently control AC currents of respective phases of the second three-phase AC motors, and
the control unit is configured to control a first switching total value M1 and a second switching total value M2 to be reversed in positive (+)/negative (−) sign, the first switching total value M1 being obtained by subtracting a number of first switching elements opened in circuit on low potential side from a number of first switching elements opened in circuit on high potential side in the first switching element group, and the second switching total value M2 being obtained by subtracting a number of second switching elements opened in circuit on low potential side from a number of second switching elements opened in circuit on high potential side in the second switching element group.

2. The motor driving apparatus according to claim 1, wherein
the first three-phase AC motors and the second three-phase AC motors are synchronously controlled, and
the first switching elements in the first switching element group and the second switching elements in the second switching element group are controlled to supply AC currents of reversed phases.

3. The motor driving apparatus according to claim 2, wherein positive or negative first noise generated by operation of the first switching elements in the first switching element group and negative or positive second noise generated by operation of the second switching elements in the second switching element group are synchronously generated.

4. The motor driving apparatus according to claim 1, wherein a phase difference corresponding to a half period of switching operation is provided between first switching operation by the first switching elements for the first three-phase AC motors and second switching operation by the second switching elements for the second three-phase AC motors.

5. The motor driving apparatus according to claim 1, wherein
first winding coils wound around each of the first stators and second winding coils wound around each of the second stators are wound in opposite directions, and
the control unit is configured to perform control to supply currents to the first three-phase AC motors and the second three-phase AC motors in opposite directions.

6. The motor driving apparatus according to claim 5, wherein the control unit is configured to perform control to supply the currents to the first three-phase AC motors and the second three-phase AC motors in the opposite directions in a state where the first three-phase AC motors and the second three-phase AC motors are stopped while voltages are applied to the first winding coils and the second winding coils.

7. The motor driving apparatus according to claim 5, wherein
the number N of individual motors in each of the first motor group and the second motor group is one, and
the control unit is configured to perform control to supply the currents to the first three-phase AC motor and the second three-phase AC motor in the opposite directions.

8. The motor driving apparatus according to claim 5, wherein
the number N of individual motors in each of the first motor group and the second motor group is a same value of two or more, and
the control unit is configured to perform control to supply the currents to all of the two or more first three-phase AC motors in a same direction, and is configured to perform control to supply the currents to all of the two or more second three-phase AC motors in a same direction that is opposite to the direction of the currents supplied to the first three-phase AC motors.

9. The motor driving apparatus according to claim 1, wherein
a first winding coil in each of the first three-phase AC motors and a second winding coil in each of the second three-phase AC motors are wound in a same direction, and
the first stators and the second stators are disposed at positions shifted by a half period in magnetic field angle.

10. The motor driving apparatus according to claim 1, wherein
each of the first three-phase AC motors includes a plurality of sets of the first stators, and
each of the second three-phase AC motors includes a plurality of sets of the second stators.

11. The motor driving apparatus according to claim 9, wherein
each of the first three-phase AC motors includes a plurality of sets of the first stators, and
each of the second three-phase AC motors includes a plurality of sets of the second stators.

12. The motor driving apparatus according to claim 10, further comprising:
a first power cable that electrically connects a plurality of first winding coils wound around each of the plurality of sets of the first stators with the first switching elements; and
a second power cable that electrically connects a plurality of second winding coils wound around each of the plurality of sets of the second stators with the second switching elements, wherein
the first power cable and the second power cable of a same phase are bundled.

13. The motor driving apparatus according to claim 1, wherein one or both of the first winding coils and the second winding coils are each configured by a pair of coils that are coaxially wound in opposite directions.

14. The motor driving apparatus according to claim 2, wherein a phase difference corresponding to a half period of switching operation is provided between first switching operation by the first switching elements for the first three-phase AC motors and second switching operation by the second switching elements for the second three-phase AC motors.

15. The motor driving apparatus according to claim 3, wherein a phase difference corresponding to a half period of switching operation is provided between first switching operation by the first switching elements for the first three-phase AC motors and second switching operation by the second switching elements for the second three-phase AC motors.

16. The motor driving apparatus according to claim 6, wherein
the number N of individual motors in each of the first motor group and the second motor group is one, and
the control unit is configured to perform control to supply the currents to the first three-phase AC motor and the second three-phase AC motor in the opposite directions.

17. The motor driving apparatus according to claim 6, wherein
the number N of individual motors in each of the first motor group and the second motor group is a same value of two or more, and
the control unit is configured to perform control to supply the currents to all of the two or more first three-phase AC motors in a same direction, and is configured to perform control to supply the currents to all of the two or more second three-phase AC motors in a same direction that is opposite to the direction of the currents supplied to the first three-phase AC motors.

18. The motor driving apparatus according to claim 11, further comprising:
a first power cable that electrically connects a plurality of first winding coils wound around each of the plurality of sets of the first stators with the first switching elements; and
a second power cable that electrically connects a plurality of second winding coils wound around each of the plurality of sets of the second stators with the second switching elements, wherein
the first power cable and the second power cable of a same phase are bundled.

* * * * *